United States Patent
Park et al.

(10) Patent No.: US 8,818,118 B2
(45) Date of Patent: Aug. 26, 2014

(54) IMAGE ENCODING DEVICE AND IMAGE PROCESSING DEVICE INCLUDING THE SAME

(75) Inventors: Deok-Soo Park, Hwaseong-si (KR); Hong-Ki Kwon, Hwaseong-si (KR); Byoung-Ju Song, Gwangju (KR); Jung-Hyun Lim, Suwon-si (KR); Sang-Hoon Ha, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 167 days.

(21) Appl. No.: 13/599,089

(22) Filed: Aug. 30, 2012

(65) Prior Publication Data

US 2013/0142445 A1    Jun. 6, 2013

(30) Foreign Application Priority Data

Dec. 5, 2011 (KR) .................. 10-2011-0128940

(51) Int. Cl.
*G06K 9/36* (2006.01)
*G06K 9/46* (2006.01)

(52) U.S. Cl.
USPC ........................................ 382/232

(58) Field of Classification Search
None
See application file for complete search history.

(56) References Cited

U.S. PATENT DOCUMENTS

| | | | |
|---|---|---|---|
| 5,828,848 A * | 10/1998 | MacCormack et al. | ...... 709/247 |
| 2008/0131087 A1 | 6/2008 | Lee et al. | |
| 2008/0175489 A1 | 7/2008 | Lee et al. | |
| 2010/0232691 A1 | 9/2010 | Sekiguchi et al. | |
| 2011/0091122 A1 | 4/2011 | Park et al. | |
| 2011/0188750 A1 * | 8/2011 | Tamura | ............... 382/167 |
| 2012/0014597 A1 * | 1/2012 | Matsunaga | ............ 382/166 |
| 2013/0322749 A1 * | 12/2013 | Ha et al. | ................ 382/165 |

FOREIGN PATENT DOCUMENTS

| | | |
|---|---|---|
| KR | 1020080047081 | 5/2008 |
| KR | 1020080049535 | 6/2008 |
| KR | 1020080068473 | 7/2008 |
| KR | 1020110041281 | 4/2011 |

* cited by examiner

*Primary Examiner* — Li Liu
(74) *Attorney, Agent, or Firm* — F. Chau & Associates, LLC

(57) ABSTRACT

An image encoding device includes a first compression unit, a second compression unit, a third compression unit and an output unit. The first compression unit generates first compressed data by compressing first data associated with a reference block in an input image. The second compression unit generates second compressed data by compressing second data associated with a current compressing block in the input image when the current compressing block corresponds to a first pattern. The current compressing block is included in the reference block. The third compression unit generates third compressed data by compressing the second data when the current compressing block corresponds to one of a plurality of second patterns. The output unit outputs compressed data based on the first compressed data, the second compressed data and the third compressed data.

20 Claims, 28 Drawing Sheets

FIG. 8A
FIG. 8B
FIG. 8C
FIG. 8D

|       | PARA01 | PARA23 | PARA02 | PARA13 | PARA03 | PARA12 |
|-------|--------|--------|--------|--------|--------|--------|
| PAT1  | <TH    | <TH    | <TH    | <TH    | <TH    | <TH    |
| PAT2A | ≧TH    | <TH    | ≧TH    | <TH    | ≧TH    | <TH    |
| PAT2B | ≧TH    | <TH    | <TH    | ≧TH    | <TH    | ≧TH    |
| PAT2C | <TH    | ≧TH    | ≧TH    | <TH    | <TH    | ≧TH    |
| PAT2D | <TH    | ≧TH    | <TH    | ≧TH    | ≧TH    | <TH    |
| PAT2E | <TH    | <TH    | ≧TH    | ≧TH    | ≧TH    | ≧TH    |
| PAT2F | ≧TH    | ≧TH    | <TH    | <TH    | ≧TH    | ≧TH    |
| PAT2G | ≧TH    | ≧TH    | ≧TH    | ≧TH    | <TH    | <TH    |

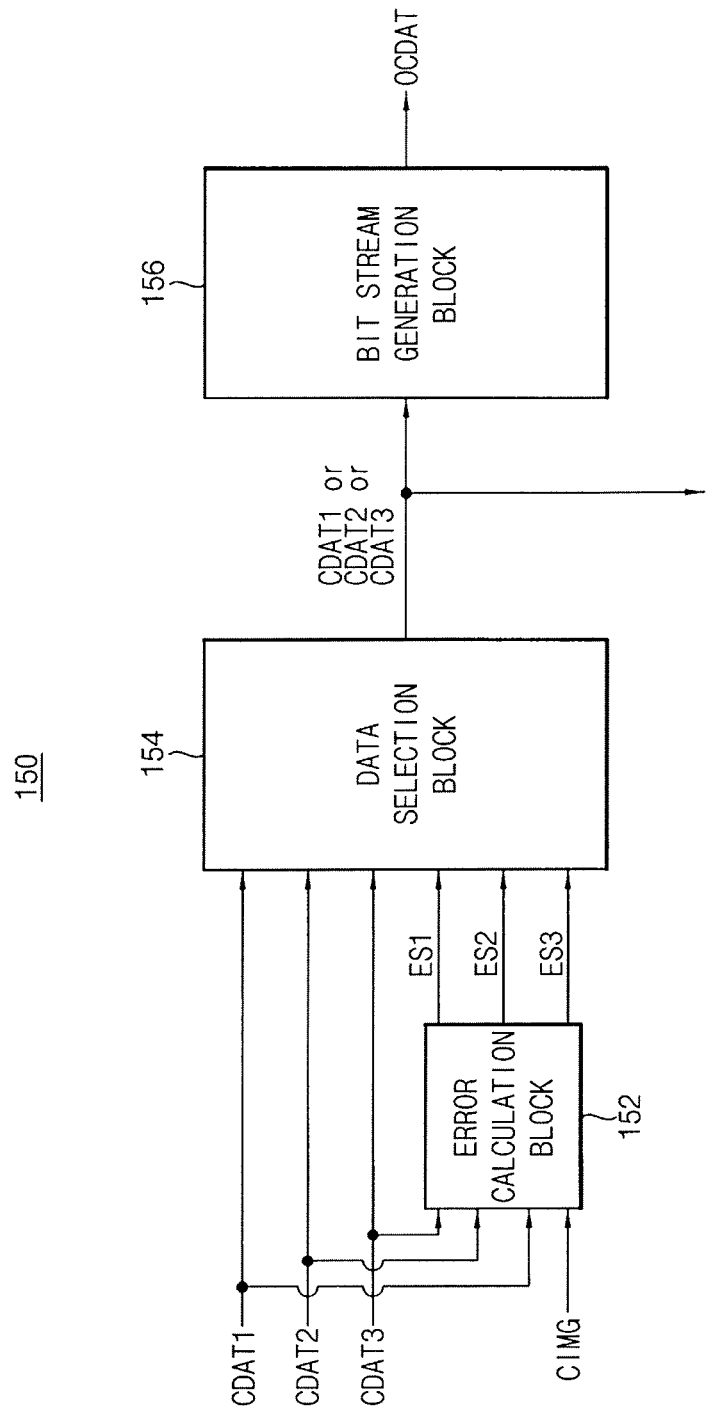

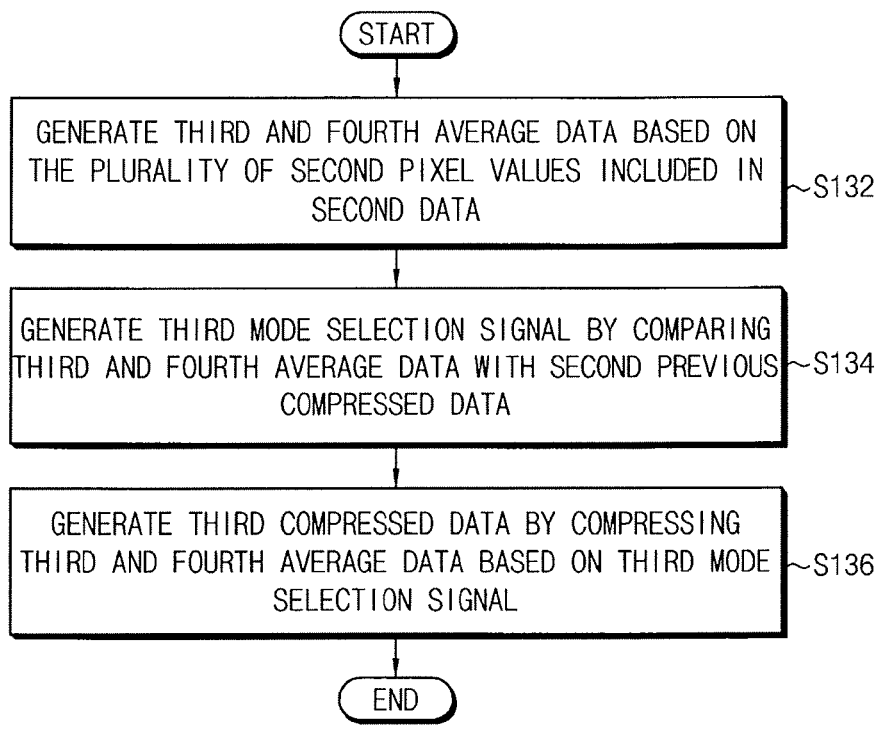
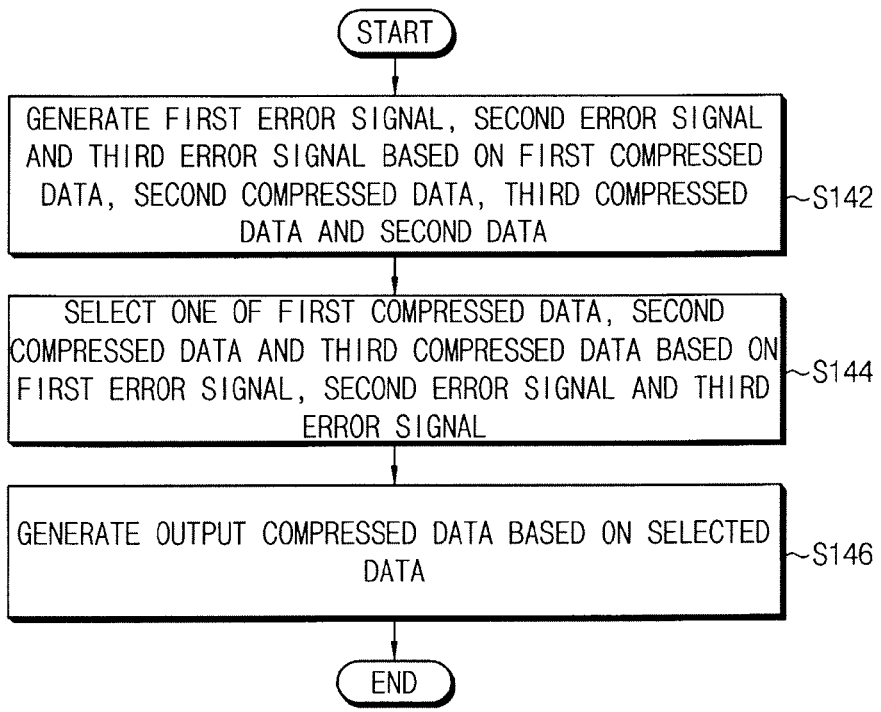

IMAGE ENCODING DEVICE AND IMAGE PROCESSING DEVICE INCLUDING THE SAME

CROSS-REFERENCE TO RELATED APPLICATION

This application claims priority under 35 U.S.C. §119 to Korean Patent Application No. 2011-0128940, filed on Dec. 5, 2011 in the Korean Intellectual Property Office (KIPO), the disclosure of which is incorporated by reference in its entirety herein.

TECHNICAL FIELD

Exemplary embodiments of the inventive concept relate generally to processing of image data to be displayed, and more particularly to an image encoding device and an image processing device including the image encoding device.

DISCUSSION OF RELATED ART

A display system may include a display device to display images and an image processing device to improve a response speed of the display device. For example, the image processing device may compensate the response speed of the display device based on a comparison of a previous image frame with a current image frame. The display system may include a storage device for storing data of the previous image frame. However, when the quality of the image and size of the image displayed by the display device are increased, so does the required capacity of the storage device. Thus, there is a need for an image processing method and system that enables a storage device of a reduced capacity to be used in a display system.

SUMMARY

According to an exemplary embodiment of the inventive concept, an image encoding device includes a first compression unit, a second compression unit, a third compression unit and an output unit. The first compression unit generates first compressed data by compressing first data associated with a reference block in an input image. The second compression unit generates second compressed data by compressing second data associated with a current compressing block in the input image when the current compressing block corresponds to a first pattern. The current compressing block is included in the reference block. The third compression unit generates third compressed data by compressing the second data when the current compressing block corresponds to one of a plurality of second patterns. The output unit outputs compressed data based on the first compressed data, the second compressed data and the third compressed data. The output compressed data may correspond to the current compressing block.

The second compression unit may generate the second compressed data if a difference between a first pixel value of the second data and a second pixel value of the second data is smaller than a threshold value. The second compression unit may generate the second compressed data if a difference between a first pixel value and a second pixel value is smaller than a threshold value. The second data associated with the current compressing block may include a plurality of pixel values. Each of the first and second pixel values may be one of the plurality of pixel values.

The third compression unit may generate the third compressed data if the difference between the first pixel value and the second pixel value is equal to or larger than the threshold value.

The output unit may select one of the first compressed data, the second compressed data and the third compressed data as selected data, and output the compressed data based on the selected data. The selected data may have a minimum error with respect to the second data.

The selected data may be one of the first compressed data and the second compressed data when the current compressing block corresponds to the first pattern. The selected data may be the third compressed data when the current compressing block corresponds to one of the plurality of second patterns.

The first data may include a plurality of first pixel values and the second data may include a plurality of second pixel values. The first compression unit may include a first averaging block, a first mode selection block and a first compression block. The first averaging block may generate first average data by averaging the plurality of first pixel values. The first mode selection block may generate a first mode selection signal by comparing the first average data with first previous compressed data. The first mode selection signal may indicate a compression scheme for the first average data. The first previous compressed data may be generated by compressing third data associated with a previous compressing block in the input image. The previous compressing block may be adjacent the current compressing block. The first compression block may generate the first compressed data by compressing the first average data based on the first mode selection signal.

The first compressed data may be generated based on a differential pulse code modulation (DPCM) scheme that calculates a difference between the first average data and the first previous compressed data and compresses the first average data based on the calculated difference if the first mode selection signal has a first logic level. The first compressed data may be generated based on a pulse code modulation (PCM) scheme that truncates a portion of the first average data if the first mode selection signal has a second logic level.

The second compression unit may include a second averaging block, a second mode selection block and a second compression block. The second averaging block may generate second average data by averaging the plurality of second pixel values. The second mode selection block may generate a second mode selection signal by comparing the second average data with the first previous compressed data. The second mode selection signal may indicate a compression scheme for the second average data. The second compression block may generate the second compressed data by compressing the second average data based on the second mode selection signal.

The third compression unit may include a third averaging block, a third mode selection block and a third compression block. The third averaging block may divide the plurality of second pixel values into a first group and a second group, may generate third average data by averaging pixel values included in the first group, and may generate fourth average data by averaging pixel values included in the second group. The third mode selection block may generate a third mode selection signal by comparing the third and fourth average data with second previous compressed data. The third mode selection signal may indicate a compression scheme for the third and fourth average data. The second previous compressed data may be generated by compressing the third data in a manner distinct from the first previous compressed data. The third compression block may generate the third compressed data by compressing the third and fourth average data based on the third mode selection signal.

The image encoding device may further include a storage unit. The storage unit may store one of the first compressed data, the second compressed data and the third compressed data, and may output the first previous compressed data and the second previous compressed data that were previously stored in the storage unit.

The image encoding device may further include a pattern decision unit. The pattern decision unit may compare a first pixel value with a second pixel value to generate comparison results and may generate a pattern decision signal based on the comparison results. The second data associated with the current compressing block may include a plurality of pixel values. Each of the first and second pixel values may be one of the plurality of pixel values. The pattern decision signal may indicate whether the current compressing block corresponds to the first pattern or one of the plurality of second patterns.

According to an exemplary embodiment of the inventive concept, an image processing device includes an image encoding device, a storage device, an image decoding device and a dynamic capacitance compensation (DCC) circuit. The image encoding device generates a compressed current image by compressing an original current image. The storage device stores the compressed current image, and outputs a compressed previous image that was previously stored in the storage device. The compressed previous image is generated by compressing an original previous image preceding the original current image. The image decoding device generates a reconstructed previous image by decompressing the compressed previous image. The DCC circuit generates a compensation image based on the original current image and the reconstructed previous image. The image encoding device includes a first compression unit, a second compression unit, a third compression unit and an output unit. The first compression unit generates first compressed data by compressing first data associated with a first reference block in the original current image. The second compression unit generates second compressed data by compressing second data associated with a first compressing block in the original current image when the first compressing block corresponds to a first pattern. The first compressing block is included in the first reference block. The third compression unit generates third compressed data by compressing the second data when the first compressing block corresponds to one of a plurality of second patterns. The output unit generates output compressed data based on the first compressed data, the second compressed data and the third compressed data. The output compressed data corresponds to the current compressing block and corresponds to a portion of the compressed current image.

The image processing device may further include a DCC input control circuit. The DCC input control circuit may determine whether the original current image is a still image or a moving image based on the reconstructed previous image and a reconstructed current image, and may output one of the original current image and the reconstructed previous image as a selected image based on a result of the determination. The reconstructed current image may be generated by decompressing the compressed current image. The DCC circuit may generate the compensation image based on the original current image and the selected image.

The image decoding device may include a mode determination unit, a decompression unit and an image reconstruction unit. The mode determination unit may generate a mode determination signal by determining a compression scheme for fourth compressed data associated with a second compressing block in the original previous image. The second compressing block may correspond to the first compressing block in the original current image. The decompression unit may generate decompressed data by decompressing the fourth compressed data based on the mode determination signal. The image reconstruction unit may generate the reconstructed previous image by reconstructing the decompressed data.

The decompression unit may include a first decompression unit, a second decompression unit and a third decompression unit. The first decompression unit may generate the decompressed data based on a first decompression scheme when the fourth compressed data is generated by compressing a plurality of first pixel values associated with a second reference block in the original previous image. The second reference block may correspond to the first reference block in the original current image. The second compressing block may be included in the second reference block. The second decompression unit may generate the decompressed data based on a second decompression scheme when the fourth compressed data is generated by compressing a plurality of second pixel values associated with the second compressing block. The third decompression unit may generate the decompressed data based on a third decompression scheme when the fourth compressed data is generated by dividing the plurality of second pixel values into a first group and a second group, by compressing pixel values included in the first group, and by compressing pixel values included in the second group.

According to an exemplary embodiment of the inventive concept, a compression system includes a first compression unit configured to generate first compressed data by compressing first average data that is an average of pixel values of a part of an input image, a second compression unit configured to generate second compressed data by compressing second average data that is an average of pixel values of a sub-part within the part smaller than the part when the sub-part is one pattern, a third compression unit configured to generate third compressed data by compressing third and fourth average data when the sub-part is a second other pattern, where the third average data is an average of some of the pixel values and the fourth average data is an average of the remaining pixel values, and an output unit configured to output compressed data by selecting one of the first, second, and third compressed data.

The first compression unit may be configured to output an error signal based on a difference between the sub-part and the first compressed data. The second compression unit may be configured to output an error signal based on a difference between the sub-part and the second compressed data. The third compression unit may be configured to output an error signal based on a difference between the sub-part and the third compressed data.

In an embodiment, each compression unit compresses average data input thereto based on a differential pulse code modulation (DPCM) scheme when previously compressed data is available and based on a PCM scheme otherwise.

In an embodiment, when the sub-part is not the one pattern, the second compression unit disables compression within itself. In an embodiment, when the sub-part is not the other pattern, the third compression unit disables compression within itself.

BRIEF DESCRIPTION OF THE DRAWINGS

Exemplary embodiments of the inventive concept will be more clearly understood from the following detailed description taken in conjunction with the accompanying drawings.

FIGS. 8A, 8B, 8C, 8D, 8E, 8F, 8G, 8H and 9 are diagrams for describing an exemplary operation of a pattern decision unit included in the image encoding device of FIG. 1.

FIG. 10 is a block diagram illustrating an exemplary embodiment of a second compression unit included in the image encoding device of FIG. 1.

FIG. 14 is a block diagram illustrating an exemplary embodiment of an output unit included in the image encoding device of FIG. 1.

FIG. 20 is a flow chart illustrating an exemplary embodiment of step S130 in FIG. 17.

FIG. 21 is a flow chart illustrating an exemplary embodiment of step S140 in FIG. 17.

DETAILED DESCRIPTION

Figure 1:
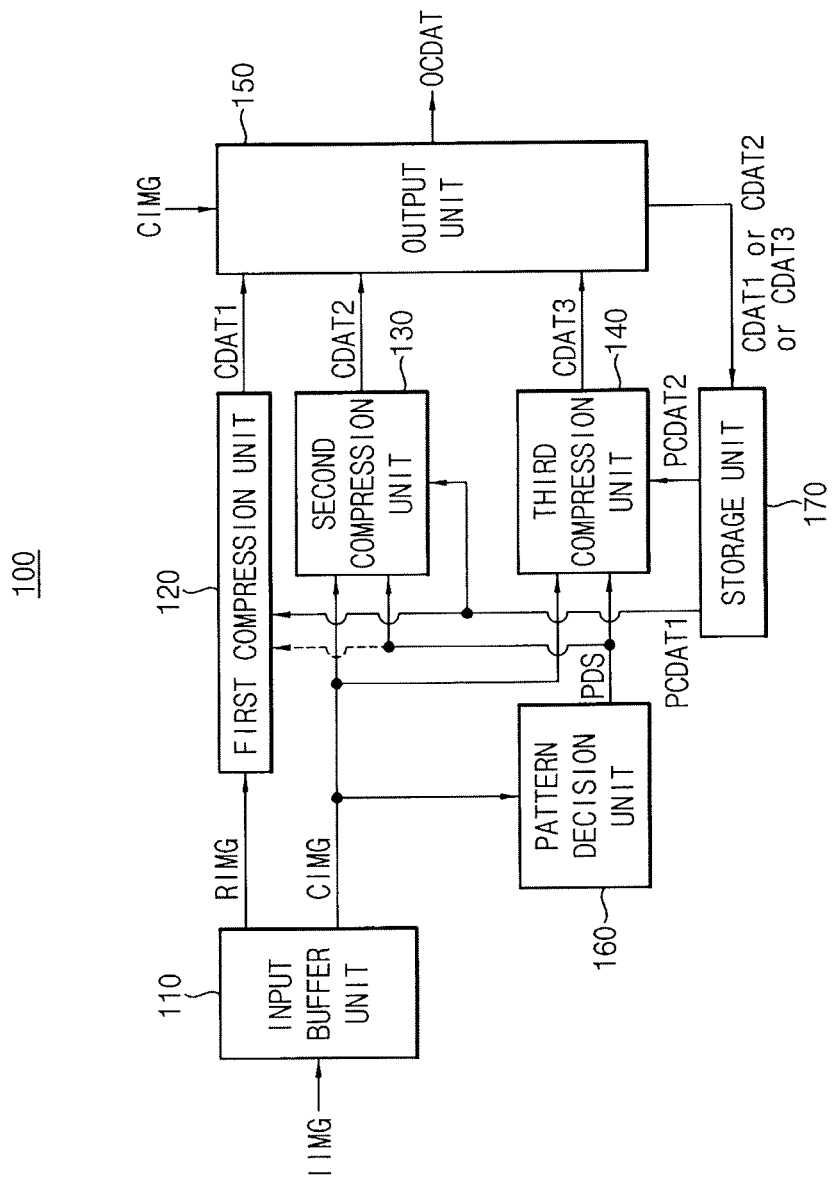
FIG. 1 is a block diagram illustrating an image encoding device according to an exemplary embodiment of the inventive concept.

Exemplary embodiments of the inventive concept will be described more fully with reference to the accompanying drawings. This inventive concept may, however, be embodied in many different forms and should not be construed as limited to the exemplary embodiments set forth herein. Like reference numerals refer to like elements throughout this application.

It will be understood that when an element is referred to as being "connected" or "coupled" to another element, it can be directly connected or coupled to the other element or intervening elements may be present. As used herein, the singular forms "a," "an" and "the" are intended to include the plural forms as well, unless the context clearly indicates otherwise.

FIG. 1 is a block diagram illustrating an image encoding device according to an exemplary embodiment of the inventive concept.

Referring to FIG. 1, an image encoding device 100 includes a first compression unit 120, a second compression unit 130, a third compression unit 140 and an output unit 150. The image encoding device 100 may further include an input buffer unit 110, a pattern decision unit 160 and a storage unit 170.

In an embodiment, the input buffer unit 110 stores image data IIMG of an input image. A display device (not illustrated), such as a liquid crystal display (LCD) device, may receive image data in units of lines (e.g., rows), and the input buffer unit 110 may include a line memory that stores the image data IIMG of the input image in units of lines. The line memory in the input buffer unit 110 may store the image data IIMG of the input image in lines of a predetermined size, and may output first data RIMG and second data CIMG. The first data RIMG may be some of the image data IIMG and may be associated with a reference block in the input image. The second data CIMG may also be some of the image data IIMG and may be associated with a current compressing block in the input image. Each of the reference block and the current compressing block may be a small image area in the input image. For example, the reference block may be a small portion of the input image. In an embodiment, the reference block includes a plurality of first unit pixels, and the current compressing block includes a plurality of second unit pixels. The current compressing block is included within the reference block. The first data RIMG may include a plurality of first pixel values associated with the plurality of first unit pixels (e.g., from the reference block), and the second data CIMG may include a plurality of second pixel values associated with the plurality of second unit pixels (e.g., from the compressing block). The input image may be compressed in units of the current compressing block.

Figure 2:
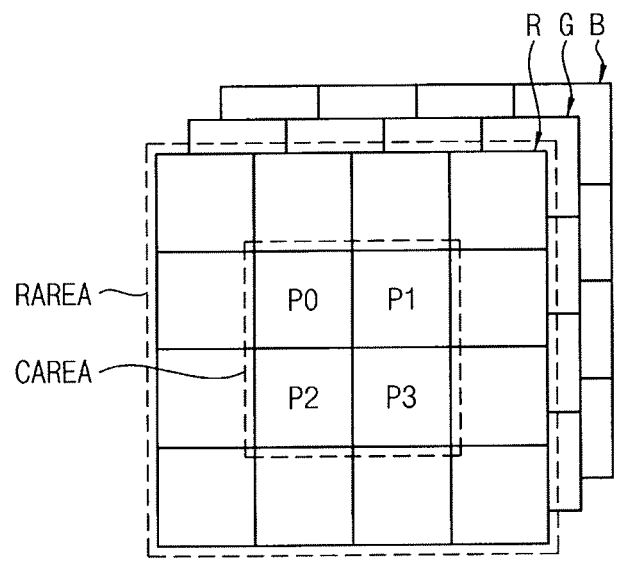
FIGS. 2 and 3 are diagrams illustrating a portion of an exemplary input image compressed by an image encoding device of FIG. 1.
Figure 3:
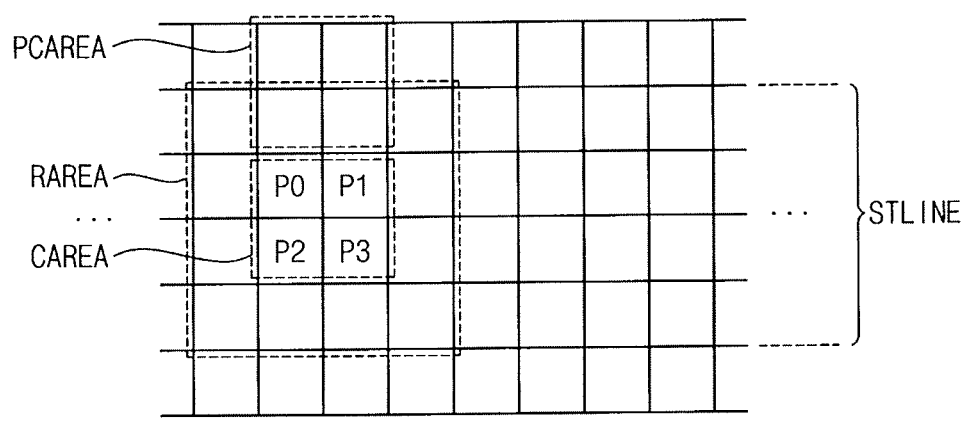

FIGS. 2 and 3 are diagrams illustrating an exemplary portion of an input image that can be compressed by the image encoding device of FIG. 1.

Referring to FIGS. 1 and 2, in an embodiment, the image encoding device 100 compresses the image data IIMG of the input image in units of 2×2 pixel blocks, where each block is comprised of four unit pixels. For example, in an embodiment, the current compressing block CAREA in the input image is comprised of four unit pixels P0, P1, P2 and P3 that are arranged in a 2×2 square matrix formation. However, this is merely an example, as the image encoding device 100 may compress the image data IIMG in units of other sizes.

In an embodiment, the second data CIMG associated with the current compressing block CAREA includes the plurality of second pixel values (e.g., four pixel values). Each of the plurality of second pixel values may be associated with a respective one of the unit pixels P0, P1, P2 and P3. Each of the plurality of second pixel values may have a red component value R, a green component value G and a blue component value B. For example, the red component value R, the green component value G and the blue component value B may be 8 bits of data, respectively. A single pixel value may be 24 bits of data (e.g., 8 bits is the red component, another 8 bits is the blue component, and the remaining 8 bits is the green component), and the second data CIMG associated with the current compressing block CAREA may be 96 bits of data (e.g., each distinct 24 bits corresponds to a different one of four unit pixels of a 2×2 pixel block).

In an embodiment, the current compressing block CAREA is located within the reference block RAREA. For example, the reference block RAREA in the input image may be comprised of sixteen unit pixels that are arranged in a 4×4 square matrix formation, and the unit pixels P0, P1, P2 and P3 may be shared by the reference block RAREA and the current compressing block CAREA. The first data RIMG associated with the reference block RAREA may include the plurality of first pixel values (e.g., sixteen pixel values).

In an embodiment, the image encoding device 100 compresses the second data CIMG associated with the current compressing block CAREA based on both the first data RIMG associated with the reference block RAREA and the second data CIMG. The compression performed by the image encode device 100 may reduce flicker noise on the display device.

Referring to FIGS. 1, 2 and 3, in an embodiment, the input buffer unit 110 stores the image data IIMG of the input image in units of four lines STLINE. In an embodiment, the input buffer 110 sequentially outputs the first data RIMG associated with the reference block RAREA and the second data CIMG associated with the current compressing block CAREA.

Third data associated with a previous compressing block PCAREA may be used for compressing the second data CIMG. In an embodiment, the previous compressing block PCAREA is adjacent the current compressing block CAREA. However, in alternate embodiments, the previous compressing block PCAREA need not be adjacent the current compressing block CAREA. The previous compressing block PCAREA may be comprised of a plurality of third unit pixels, and the third data may include a plurality of third pixel values associated with the plurality of third unit pixels. The number of the third unit pixels may be substantially the same as the number of the second unit pixels. For example, the previous compressing block PCAREA may be a small image area in the input image that is located above the current compressing block CAREA. For example, the current compressing block CAREA may be comprised of unit pixels included in first lines and the previous compressing block PCAREA may be comprised of unit pixels included in second lines that are above the first lines. Similarly to the current compressing block CAREA, the previous compressing block PCAREA may be comprised of four unit pixels that are arranged in a 2×2 square matrix formation. Some unit pixels may be shared by the reference block RAREA and the previous compressing block PCAREA. Data corresponding to the previous compressing block PCAREA may be stored in the storage unit 170.

Although FIGS. 2 and 3 illustrate the current compressing block CAREA including four unit pixels and the reference block RAREA including sixteen unit pixels, the number of unit pixels included in the current compressing block and the reference block are not limited thereto. For example, the reference block RAREA may include more than sixteen pixels or less than sixteen pixels. Although FIG. 3 illustrates the input buffer unit 110 storing the image data IIMG of the input image in units of four lines STLINE, the number of lines stored in the input buffer unit is not limited thereto. For example, the input buffer 110 could store the image data in units of less than four lines or units greater than four lines.

Referring back to FIG. 1, the first compression unit 120 generates first compressed data CDAT1 based on a first compression scheme. In an embodiment, the first compression scheme generates the first compressed data CDAT1 by averaging and compressing the first data RIMG. The first compression scheme may be divided into a first sub-compression scheme and a second sub-compression scheme depending on whether first previous compressed data PCDAT1 is directly used. The first previous compressed data PCDAT1 may correspond to the previous compressing block PCAREA in FIG. 3. The first and second sub-compression schemes will be described below with reference to FIGS. 5 and 6.

The second compression unit 130 generates second compressed data CDAT2 based on a second compression scheme when the current compressing block CAREA in FIG. 2 corresponds to a first pattern. The second compression scheme may generate the second compressed data CDAT2 by averaging and compressing the second data CIMG. The second compression scheme may be divided into the first sub-compression scheme and the second sub-compression scheme depending on whether the first previous compressed data PCDAT1 is directly used.

The third compression unit 140 generates third compressed data CDAT3 based on a third compression scheme when the current compressing block CAREA in FIG. 2 corresponds to one of a plurality of second patterns. The third compression scheme may generate third compressed data CDAT3 by dividing the current compressing block CAREA into at least two groups, and by averaging and compressing data corresponding to each group. The third compression scheme may be divided into the first sub-compression scheme and the second sub-compression scheme depending on whether second previous compressed data PCDAT2 is directly used. The second previous compressed data PCDAT2 may correspond to the previous compressing block PCAREA in FIG. 3, and may be different from the first previous compressed data PCDAT1.

In an exemplary embodiment, if the plurality of second unit pixels included in the current compressing block CAREA have the same or substantially the same pixel value (e.g., if a difference between one pixel value of the plurality of second pixel values and another pixel value of the plurality of second pixel values is smaller than a threshold value), the current compressing block CAREA corresponds to the first pattern. In another exemplary embodiment, if some of the plurality of second pixel values are different from the others of the plurality of second pixel values (e.g., if the difference between one pixel value of the plurality of second pixel values and another pixel value of the plurality of second pixel values is equal to or larger than the threshold value), the current compressing block CAREA corresponds to one of the plurality of second patterns. The first pattern and the plurality of the second patterns will be described below in detail with reference to FIGS. 8A, 8B, 8C, 8D, 8E, 8F, 8G and 8H.

The output unit 150 generates output compressed data OCDAT based on the first compressed data CDAT1, the second compressed data CDAT2 and the third compressed data CDAT3. For example, in an embodiment, the output unit 150 selects one of the first compressed data CDAT1, the second compressed data CDAT2 and the third compressed data CDAT3 as selected data, and outputs compressed data OCDAT based on the selected data. The selected data may have a minimum error with respect to the second data CIMG. For example, a difference between the second data CIMG and the selected data may be smaller than differences between the second data CIMG and the unselected data. The output compressed data OCDAT may be a digital bit stream signal. The output unit 150 may provide the selected data to the storage unit 170.

In an embodiment, the pattern decision unit 160 determines whether the current compressing block CAREA corresponds to the first pattern or one of the plurality of second patterns. For example, in an embodiment, the pattern decision unit 160 compares one pixel value of the plurality of second pixel values with another pixel value of the plurality of second pixel values to generate comparison results, and generates a pattern decision signal PDS based on the comparison results. In an embodiment, the pattern decision signal PDS indicates whether the current compressing block CAREA corresponds to the first pattern or one of the plurality of second patterns. The pattern decision signal PDS may be provided to the second compression unit 130 and the third compression unit 140, and may be further provided to the first compression unit 120. As will be described below with reference to FIGS. 4, 10 and 12, each of the first, second and third compression units 120, 130 and 140 may perform different operations depending on a value of the pattern decision signal PDS.

In an embodiment, the storage unit 170 stores the selected data (e.g., one of the first, second and third compressed data CDAT1, CDAT2 and CDAT3), and outputs the first previous compressed data PCDAT1 and the second previous compressed data PCDAT2 that were previously stored in the storage unit 170. The first previous compressed data PCDAT1 may be provided to the first and second compression units 120 and 130. The second previous compressed data PCDAT2 may be provided to the third compression unit 140.

Information loss may occur when an original image is compressed by an image encoding device. The original image may not be exactly reproduced by an image decoding device or may be reproduced with distortion. The quality of a reproduced image may decrease as the compression ratio of the image encoding device increases. Further, memory capacities and sizes of the image encoding device and the image decoding device may be limited.

The image encoding device 100 according to an exemplary embodiment of the inventive concept generates the first, second and third compressed data CDAT1, CDAT2 and CDAT3 based on three distinct schemes, and generates the output compressed data OCDAT based on the first, second and third compressed data CDAT1, CDAT2 and CDAT3. Thus, the image encoding device 100 may compress the second data CIMG associated with the current compressing block CAREA with a relatively high compression ratio. For example, a conventional image encoding device has a compression ratio of about 1:3, whereas the image encoding device 100 according to at least one embodiment has a compression ratio of about 1:5. The image encoding device 100 may have a relatively small size, reduced power consumption, and enhanced operation speed. Flicker noise on a display in an image display system that includes the image encoding device 100 may be reduced.

Hereinafter, an image encoding device according to an exemplary embodiment of the inventive concept will be explained in detail with reference to exemplary configurations of the reference block RAREA corresponding to a 4×4 pixel block and the current compressing block CAREA corresponding to a 2×2 pixel block. However, in alternate embodiments, the reference block RAREA and the current compressing block CAREA may have different sizes or shapes (e.g., rectangle, circle, oval, cross, etc.). For example, when the reference block RAREA has a rectangular shape it can have various configurations such as 4×6, 3×4, 5×6, etc.

Figure 4:
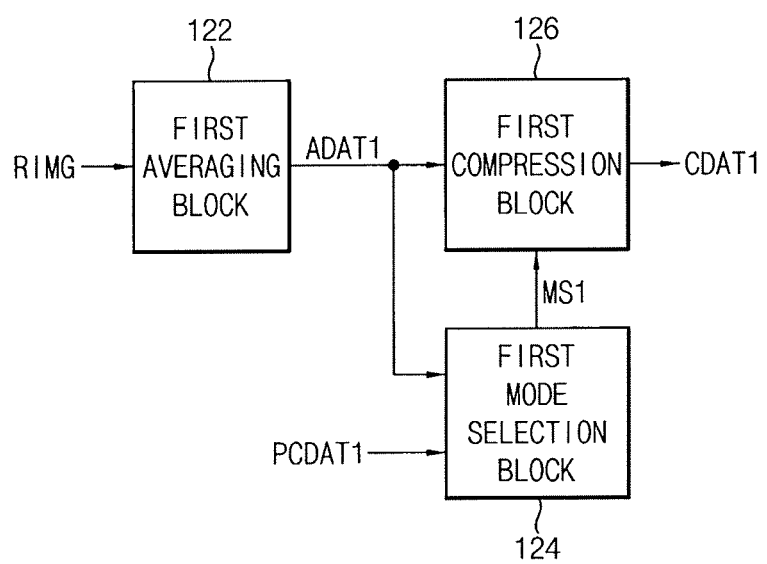
FIG. 4 is a block diagram illustrating an exemplary embodiment of a first compression unit included in the image encoding device of FIG. 1.

FIG. 4 is a block diagram illustrating an exemplary embodiment of a first compression unit included in the image encoding device of FIG. 1.

Referring to FIG. 4, the first compression unit 120 includes a first averaging block 122, a first mode selection block 124 and a first compression block 126.

In an embodiment, the first averaging block 122 generates first average data ADAT1 by averaging the plurality of first pixel values included in the first data RIMG. For example, the first average data ADAT1 may be generated by averaging the red component values R that are included in the sixteen pixel values associated with the reference block RAREA in FIG. 2, by averaging the green component values G that are included in the sixteen pixel values associated with the reference block RAREA in FIG. 2, and by averaging the blue component values B that are included in the sixteen pixel values associated with the reference block RAREA in FIG. 2. The first average data ADAT1 may be 24 bits of data that includes 8 bits of the averaged red component value, 8 bits of the averaged green component value and 8 bits of the averaged blue component value.

The first mode selection block 124 may generate a first mode selection signal MS1 by comparing the first average data ADAT1 with the first previous compressed data PCDAT1. The first mode selection signal MS1 may indicate a compression scheme for the first average data ADAT1. The first previous compressed data PCDAT1 may be generated by compressing the plurality of third pixel values included in the third data associated with the previous compressing block PCAREA in FIG. 3.

In an exemplary embodiment, the first mode selection signal MS1 indicates one of the first sub-compression scheme and the second sub-compression scheme. For example, the first mode selection signal MS1 can indicate whether the first or second sub-compression scheme is to be used on first average data ADAT1. The first sub-compression scheme may be performed by directly using the first previous compressed data PCDAT1, and may be referred to as a differential pulse code modulation (DPCM) scheme. The second sub-compression scheme may be performed by indirectly using the first previous compressed data PCDAT1, and may be referred to as a pulse code modulation (PCM) scheme. For example, the first compressed data CDAT1 may be generated based on the DPCM scheme if the first mode selection signal MS1 has a first logic level, and may be generated based on the PCM scheme if the first mode selection signal MS1 has a second other logic level. In the DPCM scheme, the first compressed data CDAT1 may be generated by calculating a difference between the first average data ADAT1 and the first previous compressed data PCDAT1 and by compressing the first average data ADAT1 based on the calculated difference. In the PCM scheme, the first compressed data CDAT1 may be generated by truncating a portion of the first average data ADAT1.

In an embodiment, the first previous compressed data PCDAT1 is supplied directly to the first compression block 126.

In an exemplary embodiment, if the first previous compressed data PCDAT1 corresponds to a predetermined null value, it is determined that the first previous compressed data PCDAT1 does not exist. In this example, the comparison operation by the first mode selection block 124 may be omitted (e.g., the comparing of the first average data ADAT1 with the previous compressed PCDAT1), and the first mode selection block 124 may generate the first mode selection signal MS1 indicating the PCM scheme (e.g., having the second logic level).

Figure 5:
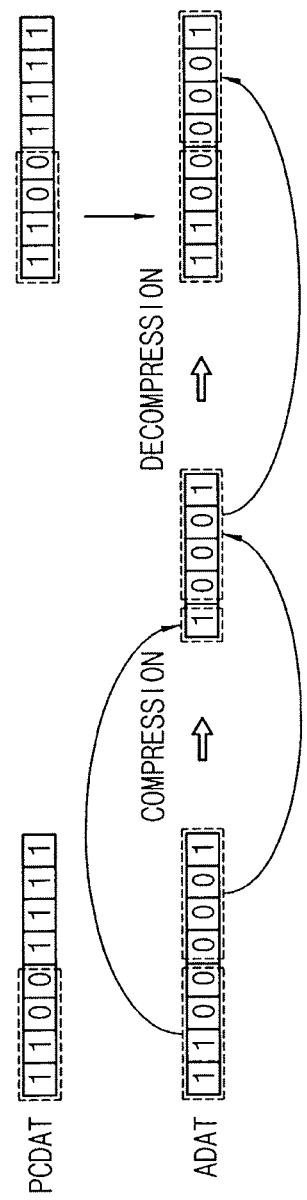
FIGS. 5 and 6 are diagrams for describing exemplary compression schemes performed by the image encoding device of FIG. 1.
Figure 6:
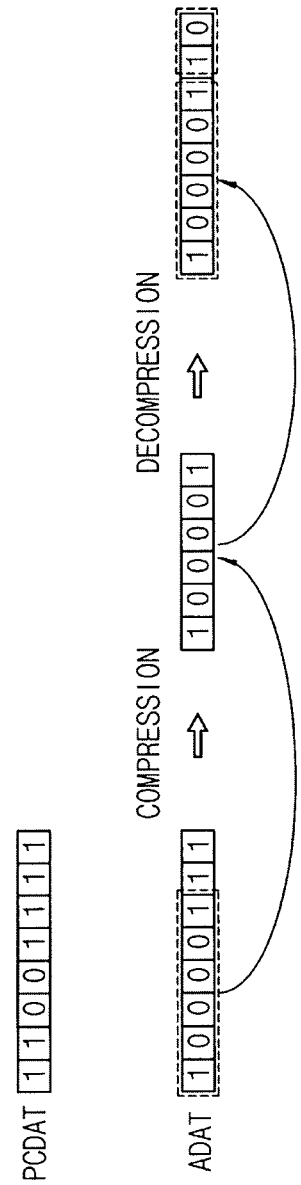

FIGS. 5 and 6 are diagrams for describing compression schemes performed by the image encoding device of FIG. 1. FIG. 5 illustrates the first sub-compression scheme (e.g., the DPCM scheme), and FIG. 6 illustrates the second sub-compression scheme (e.g., the PCM scheme).

Referring to FIG. 5, average data ADAT may be compressed based on the first sub-compression scheme if a difference between the average data ADAT and previous compressed data PCDAT is smaller than a threshold value. In the first sub-compression scheme, the average data ADAT may be compressed by generating a flag bit based on upper bits of the average data ADAT and upper bits of the previous compressed data PCDAT, and by adding lower bits of the average data ADAT to the flag bit. For example, the previous compressed data PCDAT may be directly used in the first sub-compression scheme. In a first sub-decompression scheme corresponding to the first sub-compression scheme, the data compressed by the first sub-compression scheme may be decompressed by obtaining the upper bits of the previous compressed data PCDAT based on the flag bit and by adding lower bits of the data compressed by the first sub-compression scheme to the obtained upper bits of the previous compressed data PCDAT.

For example, the average data ADAT may be "11000001" and the previous compressed data PCDAT may be "11001111," as illustrated in FIG. 5. If it is assumed that the threshold value is "1111," the difference between the average data ADAT and the previous compressed data PCDAT is "1110," which is smaller than the threshold value. Thus, the average data ADAT may be compressed based on the first sub-compression scheme. In the first sub-compression scheme, the flag bit may be generated as "1," and may indicate that the upper four bits of the average data ADAT are substantially the same as the upper four bits of the previous compressed data PCDAT. The lower four bits "0001" of the average data ADAT may be added to the flag bit "1," and the compressed data may be generated as "10001." In the first sub-decompression scheme, the upper four bits "1100" of the previous compressed data PCDAT may be obtained based on the flag bit "1." The lower four bits "0001" of the compressed data may be added to the upper four bits "1100" of the previous compressed data PCDAT, and the decompressed data may be generated as "11000001."

Referring to FIG. 6, the average data ADAT may be compressed based on the second sub-compression scheme if the difference between the average data ADAT and previous compressed data PCDAT is equal to or larger than the threshold value. In the second sub-compression scheme, the average data ADAT may be compressed by truncating at least one bit (e.g., at least one of lower bits) of the average data ADAT. For example, the previous compressed data PCDAT may be indirectly used in the second sub-compression scheme. In a second sub-decompression scheme corresponding to the second sub-compression scheme, the data compressed by the second sub-compression scheme may be decompressed by adding at least one of several predetermined insertion bits to the compressed data. Although the insertion bits are different from the truncated bits, an error between the insertion bits and the truncated bits may be negligible.

For example, the average data ADAT may be "10000111" and the previous compressed data PCDAT may be "11001111," as illustrated in FIG. 6. If it is assumed that the threshold value is "1111," the difference between the average data ADAT and the previous compressed data PCDAT is "1001000," which is larger than the threshold value. Thus, the average data ADAT may be compressed based on the second sub-compression scheme. In the second sub-compression scheme, the lower two bits "11" of the average data ADAT may be truncated, and the compressed data may be generated as "100001." In the second sub-decompression scheme, the predetermined insertion bits "10" may be added to the compressed data, and the decompressed data may be generated as "10000110." The error between the average data ADAT "10000111" and the decompressed data "10000110" may be negligible.

Although FIGS. 5 and 6 illustrate the average data ADAT as 8 bits of data, the first average data ADAT1 in FIG. 4 may be 24 bits of data that includes 8 bits of the averaged red component value, 8 bits of the averaged green component value and 8 bits of the averaged blue component value, and the first average data ADAT1 may be compressed with respect to the averaged red component value, the averaged green component value and the averaged blue component value, respectively. Further, the threshold value, the flag bit and the insertion bits are not limited to "1111," "1" and "10," as illustrated in FIGS. 5 and 6.

Referring back to FIG. 4, the first compression block 126 may generate the first compressed data CDAT1 by compressing the first average data ADAT1 based on the first mode selection signal MS1. For example, the first compression block 126 may generate the first compressed data CDAT1 by compressing the first average data ADAT1 based on the first sub-compression scheme if the first mode selection signal MS1 has the first logic level. The first compression block 126 may generate the first compressed data CDAT1 by compressing the first average data ADAT1 based on the second sub-compression scheme if the first mode selection signal MS1 has the second logic level.

Although not illustrated in FIG. 4, the first compression unit 120 may further receive the pattern decision signal PDS generated from the pattern decision unit 160 in FIG. 1, and may be selectively enabled based on the pattern decision signal PDS. For example, when the current compressing block CAREA in FIG. 2 corresponds to the first pattern (e.g., when the pattern decision signal PDS has a first value), the first compression unit 120 is enabled, performs averaging and compression operations, and generates the first compressed data CDAT1 that corresponds to the first data RIMG associated with the reference block RAREA in FIG. 2. When the current compressing block CAREA in FIG. 2 corresponds to one of the plurality of second patterns (e.g., when the pattern decision signal PDS has one of a plurality of second values), the first compression unit 120 is disabled, does not perform averaging and compression operations, and generates the first compressed data CDAT1 having the predetermined null value.

Figure 7A:
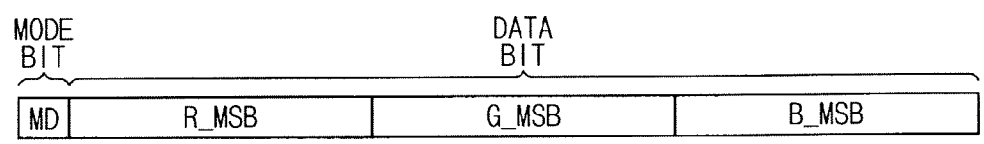
FIGS. 7A and 7B are diagrams for describing an exemplary operation of the first compression unit of FIG. 4.
Figure 7B:
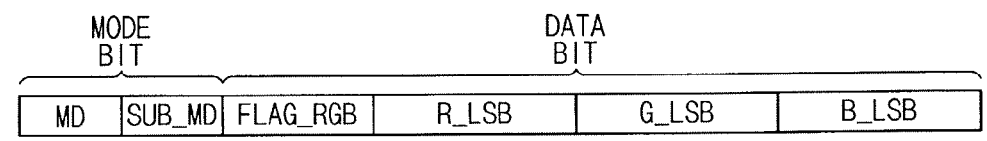

FIGS. 7A and 7B are diagrams for describing an exemplary operation of the first compression unit of FIG. 4. FIG. 7A illustrates an example of a bit stream of the first compressed data CDAT1 generated based on the second sub-compression scheme (e.g., the PCM scheme). FIG. 7B illustrates an example of a bit stream of the first compressed data CDAT1 generated based on the first sub-compression scheme (e.g., the DPCM scheme).

Referring to FIG. 7A, MD represents the compression scheme for the first average data ADAT1, R_MSB represents a portion of the averaged red component value included in the first average data ADAT1, G_MSB represents a portion of the averaged green component value included in the first average data ADAT1, and B_MSB represents a portion of the averaged blue component value included in the first average data ADAT1. As described above with reference to FIG. 6, the lower bits of the averaged red component value, the lower bits of the averaged green component value and the lower bits of the averaged blue component value may be truncated in the second sub-compression scheme. Thus, R_MSB may correspond to the upper bits of the averaged red component value, G_MSB may correspond to the upper bits of the averaged green component value, and B_MSB may correspond to the upper bits of the averaged blue component value.

In an exemplary embodiment, the first compressed data CDAT1 is 19 bits of data. 1 bit of data may be assigned to MD. For example, if the first compressed data CDAT1 is generated by averaging and compressing the first data RIMG (e.g., based on the first compression scheme and based on the second sub-compression scheme), MD may be set to "0." 6 bits of data may be assigned to R_MSB, G_MSB and B_MSB, respectively. The first compressed data CDAT1 may assure the accuracy of the upper six bits of the averaged red component value, the upper six bits of the averaged green component value, and the upper six bits of the averaged blue component value.

Referring to FIG. 7B, MD and SUB_MD represent the compression scheme for the first average data ADAT1, FLAG_RGB represents flag bits of the averaged red, green and blue component values. R_LSB represents a portion of the averaged red component value included in the first average data ADAT1, G_LSB represents a portion of the averaged green component value included in the first average data ADAT1, and B_MSB represents a portion of the averaged blue component value included in the first average data ADAT1. As described above with reference to FIG. 5, the lower bits of the averaged red component value, the lower bits of the averaged green component value and the lower bits of the averaged blue component value need not be truncated, and instead can be added to the flag bits in the first sub-compression scheme. Thus, R_LSB may correspond to the lower bits of the averaged red component value, G_LSB may correspond to the lower bits of the averaged green component value, and B_MSB may correspond to the lower bits of the averaged blue component value.

In an exemplary embodiment, the first compressed data CDAT1 is 19 bits of data. 2 bits of data may be assigned to MD and SUB_MD, respectively. For example, if the first compressed data CDAT1 is generated by averaging and compressing the first data RIMG (e.g., based on the first compression scheme and based on the first sub-compression scheme), MD and SUB_MD may be set to "10" and "00," respectively. 3 bits of data may be assigned to FLAG_RGB. Each bit of FLAG_RGB may be set to "1" if the upper four bits of the first average data ADAT1 are substantially the same as the upper four bits of the first previous compressed data PCDAT1, and may be set to "0" if the upper three bits of the first average data ADAT1 are substantially the same as the upper three bits of the first previous compressed data PCDAT1. For example, if the upper four bits of the averaged red, green and blue component values in the first average data ADAT1 are substantially the same as the upper four bits of averaged red, green and blue data in the first previous compressed data PCDAT1, respectively, FLAG_RGB may be set to "111." 4 bits of data may be assigned to R_LSB, G_LSB and B_LSB, respectively. The first compressed data CDAT1 may assure the accuracy of the upper seven or eight bits of the averaged red component value, the upper seven or eight bits of the averaged green component value, and the upper seven or eight bits of the averaged blue component value depending on each bit of FLAG_RGB.

Figure 8E:
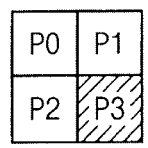
Figure 8F:
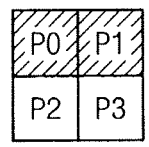
Figure 8G:
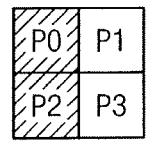
Figure 8H:
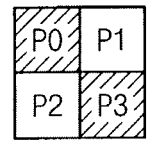
Figures 9, 10:
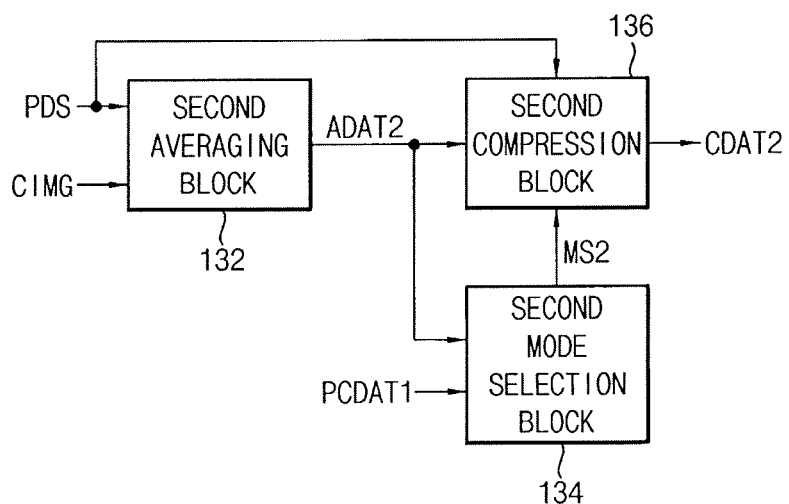

FIGS. 8A, 8B, 8C, 8D, 8E, 8F, 8G, 8H and 9 are diagrams for describing an exemplary operation of a pattern decision unit included in the image encoding device of FIG. 1. FIG. 8A illustrates an example of the first pattern. FIGS. 8B, 8C, 8D, 8E, 8F, 8G and 8H illustrate examples of the plurality of second patterns, respectively. FIG. 9 illustrates an example of a reference table that can be used to determine whether a pattern corresponds to the current compressing block CAREA in FIG. 2.

Referring to FIG. 8A, if the plurality of unit pixels P0, P1, P2 and P3 included in the current compressing block CAREA have the same or substantially the same pixel value, the current compressing block CAREA corresponds to the first pattern.

Referring to FIGS. 8B, 8C, 8D, 8E, 8F, 8G and 8H, if some of the pixel values associated with the unit pixels P0, P1, P2 and P3 are different from the others of the pixel values associated with the unit pixels P0, P1, P2 and P3, the current compressing block CAREA corresponds to one of the plurality of second patterns.

In an embodiment, the number of the second patterns is seven if the current compressing block CAREA is comprised of four unit pixels P0, P1, P2 and P3. For example, the second patterns may include a pattern A illustrated in FIG. 8B, a pattern B illustrated in FIG. 8C, a pattern C illustrated in FIG. 8D, a pattern D illustrated in FIG. 8E, a pattern E illustrated in FIG. 8F, a pattern F illustrated in FIG. 8G, and a pattern G illustrated in FIG. 8H. In the pattern A, a pixel value associated with the unit pixel P0 may be different from pixel values associated with the unit pixels P1, P2 and P3. In the pattern B, the pixel value associated with the unit pixel P1 may be different from the pixel values associated with the unit pixels P0, P2 and P3. In the pattern C, the pixel value associated with the unit pixel P2 may be different from the pixel values associated with the unit pixels P0, P1 and P3. In the pattern D, the pixel value associated with the unit pixel P3 may be different from the pixel values associated with the unit pixels P0, P1 and P2. In the pattern E, the pixel values associated with the unit pixels P0 and P1 may be different from the pixel values associated with the unit pixels P2 and P3. In the pattern F, the pixel values associated with the unit pixels P0 and P2 may be different from the pixel values associated with the unit pixels P1 and P3. In the pattern G, the pixel values associated with the unit pixels P0 and P3 may be different from the pixel values associated with the unit pixels P1 and P2.

Referring to FIGS. 1 and 9, in an embodiment, the pattern decision unit 160 generates a plurality of parameters PARA01, PARA23, PARA02, PARA13, PARA03 and PARA12 based on the pixel values associated with the unit pixels P0, P1, P2 and P3. The current compressing area CAREA may be comprised of the unit pixels P0, P1, P2 and P3, and the second data CIMG may include four pixel values associated with the unit pixels P0, P1, P2 and P3.

A first parameter PARA01 may correspond to a difference between the pixel value associated with the unit pixel P0 and the pixel value associated with the unit pixel P1. A second parameter PARA23 may correspond to a difference between the pixel value associated with the unit pixel P2 and the pixel value associated with the unit pixel P3. A third parameter PARA02 may correspond to a difference between the pixel value associated with the unit pixel P0 and the pixel value associated with the unit pixel P2. A fourth parameter PARA13 may correspond to a difference between the pixel value associated with the unit pixel P1 and the pixel value associated with the unit pixel P3. A fifth parameter PARA03 may correspond to a difference between the pixel value associated with the unit pixel P0 and the pixel value associated with the unit pixel P3. A sixth parameter PARA12 may correspond to a difference between the pixel value associated with the unit pixel P1 and the pixel value associated with the unit pixel P2.

The plurality of parameters PARA01, PARA23, PARA02, PARA13, PARA03 and PARA12 may be represented by Equations 1, 2, 3, 4, 5 and 6, respectively.

$$PARA01 = |R0-R1| + |G0-G1| + |B0-B1| \quad \text{[Equation 1]}$$

$$PARA23 = |R2-R3| + |G2-G3| + |B2-B3| \quad \text{[Equation 2]}$$

$$PARA02 = |R0-R2| + |G0-G2| + |B0-B2| \quad \text{[Equation 3]}$$

$$PARA13 = |R1-R3| + |G1-G3| + |B1-B3| \quad \text{[Equation 4]}$$

$$PARA03 = |R0-R3| + |G0-G3| + |B0-B3| \quad \text{[Equation 5]}$$

$$PARA12 = |R1-R2| + |G1-G2| + |B1-B2| \quad \text{[Equation 6]}$$

In the Equations 1, 2, 3, 4, 5 and 6, R0, G0 and B0 represent the red, green and blue component values of the pixel value associated with the unit pixel P0. R1, G1 and B1 represent the red, green and blue component values of the pixel value associated with the unit pixel P1. R2, G2 and B2 represent the red, green and blue component values of the pixel value associated with the unit pixel P2. R3, G3 and B3 represent the red, green and blue component values of the pixel value associated with the unit pixel P3.

The pattern decision unit 160 may generate the pattern decision signal PDS based on the plurality of parameters PARA01, PARA23, PARA02, PARA13, PARA03 and PARA12 and the threshold value TH. The pattern decision unit 160 may determine whether the current compressing block CAREA corresponds to the first pattern or one of the plurality of second patterns, based on the reference table of FIG. 9. In FIG. 9, PAT1 represents the first pattern in FIG. 8A, PAT2A represents the pattern A in FIG. 8B, PAT2B represents the pattern B in FIG. 8C, PAT2C represents the pattern C in FIG. 8D, PAT2D represents the pattern D in FIG. 8E, PAT2E represents the pattern E in FIG. 8F, PAT2F represents the pattern F in FIG. 8G, and PAT2G represents the pattern G in FIG. 8H.

For example, if all of the plurality of parameters PARA01, PARA23, PARA02, PARA13, PARA03 and PARA12 are smaller than the threshold value TH, it is determined that the current compressing block CAREA corresponds to the first pattern in FIG. 8A. If the first, third and fifth parameters PARA01, PARA02 and PARA03 are larger than the threshold value TH, and if the second, fourth and sixth parameters PARA23, PARA13 and PARA12 are smaller than the threshold value TH, it is determined that the current compressing block CAREA corresponds to the pattern A in FIG. 8B.

In an exemplary embodiment, if the current compressing block CAREA corresponds to the first pattern in FIG. 8A, the pattern decision signal PDS may be set to "000." If the current compressing block CAREA corresponds to the pattern A in FIG. 8B, the pattern decision signal PDS may be set to "001." If the current compressing block CAREA corresponds to the pattern B in FIG. 8C, the pattern decision signal PDS may be set to "010." If the current compressing block CAREA corresponds to the pattern C in FIG. 8D, the pattern decision signal PDS may be set to "011." If the current compressing block CAREA corresponds to the pattern D in FIG. 8E, the pattern decision signal PDS may be set to "100." If the current compressing block CAREA corresponds to the pattern E in FIG. 8F, the pattern decision signal PDS may be set to "101." If the current compressing block CAREA corresponds to the pattern F in FIG. 8G, the pattern decision signal PDS may be set to "110." If the current compressing block CAREA corresponds to the pattern G in FIG. 8H, the pattern decision signal PDS may be set to "111." Thus, each bit pattern of the pattern decision signal PDS corresponds to a different one of the patterns.

Although not illustrated in FIG. 1, the pattern decision unit 160 may include a parameter generation block and a pattern decision signal generation block. The parameter generation block may generate the plurality of parameters PARA01, PARA23, PARA02, PARA13, PARA03 and PARA12 based on the pixel values associated with the unit pixels P0, P1, P2 and P3. The pattern decision signal generation block may generate the pattern decision signal PDS based on the threshold value TH and the plurality of parameters PARA01, PARA23, PARA02, PARA13, PARA03 and PARA12.

FIG. 10 is a block diagram illustrating an exemplary embodiment of a second compression unit included in the image encoding device of FIG. 1.

Referring to FIG. 10, the second compression unit 130 includes a second averaging block 132, a second mode selection block 134 and a second compression block 136.

The second averaging block 132 may generate second average data ADAT2 by averaging the plurality of second pixel values included in the second data CIMG. For example, the second average data ADAT2 may be generated by averaging the red component values R that are included in the four pixel values associated with the current compressing block CAREA in FIG. 2, by averaging the green component values G that are included in the four pixel values associated with the current compressing block CAREA in FIG. 2, and by averaging the blue component values B that are included in the four pixel values associated with the current compressing block CAREA in FIG. 2. The second average data ADAT2 may be 24 bits of data that includes 8 bits of the averaged red component value, 8 bits of the averaged green component value and 8 bits of the averaged blue component value.

The second mode selection block 134 may generate a second mode selection signal MS2 by comparing the second average data ADAT2 with the first previous compressed data PCDAT1. The second mode selection signal MS2 may indicate a compression scheme for the second average data ADAT2. In an exemplary embodiment, the second mode selection signal MS2 indicate one of the first sub-compression scheme that is described with reference to FIG. 5 and the second sub-compression scheme that is described with reference to FIG. 6. In another exemplary embodiment, if the first previous compressed data PCDAT1 corresponds to the predetermined null value, the second mode selection block 134 generates the second mode selection signal MS2 indicating the second sub-compression scheme.

The second compression block 136 may generate the second compressed data CDAT2 by compressing the second average data ADAT2 based on the second mode selection signal MS2.

The second averaging block 132 and the second compression block 136 may further receive the pattern decision signal PDS, and may be selectively enabled based on the pattern decision signal PDS. For example, when the current compressing block CAREA in FIG. 2 corresponds to the first pattern (e.g., when the pattern decision signal PDS is "000"), the second averaging block 132 and the second compression block 136 are enabled, perform averaging and compression operations, and generate the second compressed data CDAT2 that corresponds to the second data CIMG associated with the current compressing block CAREA in FIG. 2. When the current compressing block CAREA in FIG. 2 corresponds to one of the plurality of second patterns (e.g., when the pattern decision signal PDS is one of "001," "010," "011," "100," "101,", "110" and "111"), the second averaging block 132 and the second compression block 136 are disabled, do not perform averaging and compression operations, and generate the second compressed data CDAT2 that has the predetermined null value.

Figure 11A:
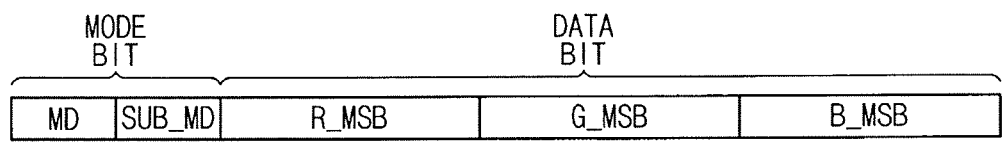
FIGS. 11A and 11B are diagrams for describing an exemplary operation of the second compression unit of FIG. 10.
Figure 11B:
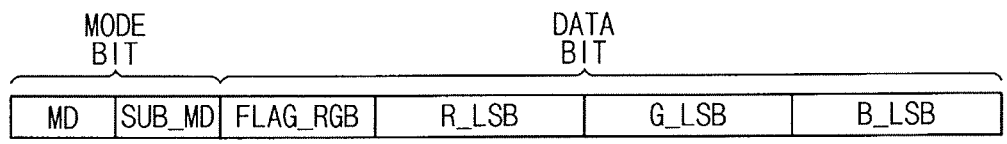

FIGS. 11A and 11B are diagrams for describing an exemplary operation of the second compression unit of FIG. 10. FIG. 11A illustrates an example of a bit stream of the second compressed data CDAT2 generated by the second sub-compression scheme (e.g., the PCM scheme). FIG. 11B illustrates an example of a bit stream of the second compressed data CDAT2 generated by the first sub-compression scheme (e.g., the DPCM scheme).

Referring to FIG. 11A, MD and SUB_MD represent the compression scheme for the second average data ADAT2, R_MSB represents a portion of the averaged red component value included in the second average data ADAT2, G_MSB represents a portion of the averaged green component value included in the second average data ADAT2, and B_MSB represents a portion of the averaged blue component value included in the second average data ADAT2. R_MSB may correspond to the upper bits of the averaged red component value, G_MSB may correspond to the upper bits of the averaged green component value, and B_MSB may correspond to the upper bits of the averaged component value data.

In an exemplary embodiment, the second compressed data CDAT2 is 19 bits of data. 2 bits of data may be assigned to MD and SUB_MD, respectively. For example, if the second compressed data CDAT2 is generated by averaging and compressing the second data CIMG (e.g., based on the second compression scheme and on the second sub-compression scheme), MD and SUB_MD may be set to "10" and "01," respectively. 5 bits of data may be assigned to R_MSB, G_MSB and B_MSB, respectively. The second compressed data CDAT2 may assure the accuracy of the upper five bits of the averaged red component value, the upper five bits of the averaged green component value, and the upper five bits of the averaged blue component value.

Referring to FIG. 11B, MD and SUB_MD represent the compression scheme for the second average data ADAT2 and FLAG_RGB represents flag bits of the averaged red, green and blue component values. R_LSB represents a portion of the averaged red component value in the second average data ADAT2, G_LSB represents a portion of the averaged green component value in the second average data ADAT2, and B_MSB represents a portion of the averaged blue component value in the second average data ADAT2. R_LSB may correspond to the lower bits of the averaged red component value, G_LSB may correspond to the lower bits of the averaged green component value, and B_LSB may correspond to the lower bits of the averaged blue component value.

In an exemplary embodiment, the second compressed data CDAT2 is 19 bits of data. 2 bits of data may be assigned to MD and SUB_MD, respectively. For example, if the second compressed data CDAT2 is generated by averaging and compressing the second data CIMG (e.g., based on the second compression scheme and based on the first sub-compression scheme), MD and SUB_MD may be set to "10" and "10," respectively. 3 bits of data may be assigned to FLAG_RGB. Each bit of FLAG_RGB may be set to "1" if the upper four bits of the second average data ADAT2 are substantially the same as the upper four bits of the first previous compressed data PCDAT1, and may be set to "0" if the upper three bits of the second average data ADAT2 are substantially the same as the upper three bits of the first previous compressed data PCDAT1. 4 bits of data may be assigned to R_LSB, G_LSB and B_LSB, respectively. The second compressed data CDAT2 may assure the accuracy of upper seven or eight bits of the averaged red component value, upper seven or eight bits of the averaged green component value, and upper seven or eight bits of the averaged blue component value depending on each bit of FLAG_RGB.

Figure 12:
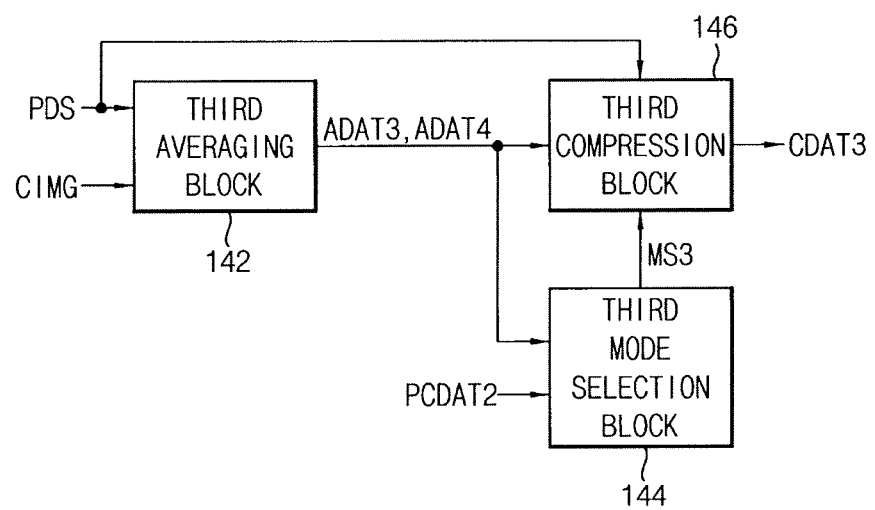
FIG. 12 is a block diagram illustrating an exemplary embodiment of a third compression unit included in the image encoding device of FIG. 1.

FIG. 12 is a block diagram illustrating an exemplary embodiment of a third compression unit included in the image encoding device of FIG. 1.

Referring to FIG. 12, the third compression unit 140 includes a third averaging block 142, a third mode selection block 144 and a third compression block 146.

In an embodiment, the third averaging block 142 divides the plurality of second pixel values included in the second data CIMG into a first group and a second group, generates third average data ADAT3 based on pixel values included in the first group, and generates fourth average data ADAT4 based on pixel values included in the second group. In an exemplary embodiment, each of the third and fourth average data ADAT3 and ADAT4 is 24 bits of data that includes 8 bits of the averaged red component value, 8 bits of the averaged green component value and 8 bits of the averaged blue component value.

For example, when the current compressing block CAREA corresponds to the pattern A in FIG. 8B, the pixel value associated with the unit pixel P0 may be determined as the first group, and the pixel values associated with the unit pixels P1, P2 and P3 may be determined as the second group. The third averaging block 142 may output the pixel value associated with the unit pixel P0 as the third average data ADAT3, and may generate the fourth average data ADAT4 by averaging the pixel values associated with the unit pixels P1, P2 and P3. For example, when the current compressing block CAREA corresponds to the pattern E in FIG. 8F, the pixel values associated with the unit pixels P0 and P1 may be determined as the first group, and the pixel values associated with the unit pixels P2 and P3 may be determined as the second group. The third averaging block 142 may generate the third average data ADAT3 by averaging the pixel values associated with the unit pixels P0 and P1, and may generate the fourth average data ADAT4 by averaging the pixel values associated with the unit pixels P2 and P3.

The third mode selection block 144 may generate a third mode selection signal MS3 by comparing the third and fourth average data ADAT3 and ADAT4 with second previous compressed data PCDAT2. The third mode selection signal MS3 may indicate a compression scheme for the third and fourth average data ADAT3 and ADAT4. The second previous compressed data PCDAT2 may be generated by compressing the third data associated with the previous compressing block PCAREA in FIG. 3, in a manner distinct from the first previous compressed data PCDAT1. For example, the first previous compressed data PCDAT1 may be generated by compressing the plurality of third pixel values included in the third data based on the first compression scheme or the second compression scheme. The second previous compressed data PCDAT2 may be generated by compressing the plurality of third pixel values included in the third data based on the third compression scheme.

In an exemplary embodiment, the third mode selection signal MS3 indicates one of the first sub-compression scheme that is described with reference to FIG. 5 and the second sub-compression scheme that is described with reference to FIG. 6. In another exemplary embodiment, if the second previous compressed data PCDAT2 corresponds to the predetermined null value, the third mode selection block 144 generates the third mode selection signal MS3 indicating the second sub-compression scheme.

The third compression block 146 may generate the third compressed data CDAT3 by compressing the third and fourth average data ADAT3 and ADAT4 based on the third mode selection signal MS3.

The third averaging block 142 and the third compression block 146 may further receive the pattern decision signal PDS, and may be selectively enabled based on the pattern decision signal PDS. For example, when the current compressing block CAREA in FIG. 2 corresponds to one of the plurality of second patterns (e.g., when the pattern decision signal PDS is one of "001," "010," "011," "100," "101,", "110" and "111"), the third averaging block 142 and the third compression block 146 are enabled, perform averaging and compression operations, and generate the third compressed data CDAT3 that corresponds to the second data CIMG associated with the current compressing block CAREA in FIG. 2. When the current compressing block CAREA in FIG. 2 corresponds to the first pattern (e.g., when the pattern decision signal PDS is "000"), the third averaging block 142 and the third compression block 146 are disabled, do not perform averaging and compression operations, and generate the third compressed data CDAT3 that has the predetermined null value.

Figure 13A:
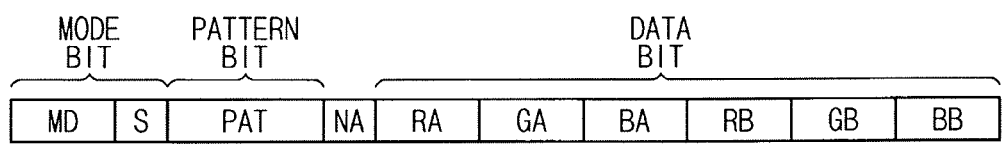
FIGS. 13A and 13B are diagrams for describing an exemplary operation of the third compression unit of FIG. 12.
Figure 13B:
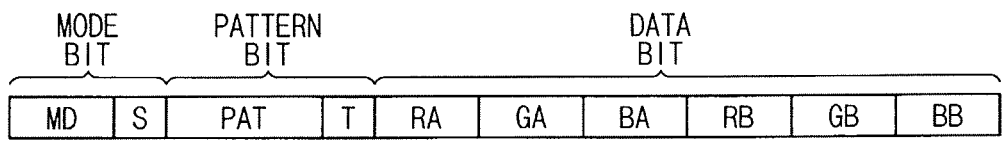

FIGS. 13A and 13B are diagrams for describing an exemplary operation of the third compression block of FIG. 12. FIG. 13A illustrates an example of a bit stream of the third compressed data CDAT3 generated by the second sub-compression scheme (e.g., the PCM scheme). FIG. 13B illustrates an example of a bit stream of the third compressed data CDAT3 generated by the first sub-compression scheme (e.g., the DPCM scheme).

Referring to FIG. 13A, MD and S represent the compression scheme for the third and fourth average data ADAT3 and ADAT4, PAT represents a pattern type of the current compressing block CAREA, and NA represents unused bits. RA represents a portion of the averaged red component value included in the third average data ADAT3, GA represents a portion of the averaged green data included in the third average data ADAT3, and BA represents a portion of the averaged blue data included in the third average data ADAT3. RB represents a portion of the averaged red data included in the fourth average data ADAT4, GB represents a portion of the averaged green data included in the fourth average data ADAT4, and BB represents a portion of the averaged blue data included in the fourth average data ADAT4. RA, GA and BA may correspond to the upper bits of the averaged red, green and blue component values included in the third average data ADAT3, respectively. RB, GB and BB may correspond to the upper bits of the averaged red, green and blue component values included in the fourth average data ADAT4, respectively.

In an exemplary embodiment, the third compressed data CDAT3 is 19 bits of data. 2 bits of data may be assigned to MD, and 1 bit of data may be assigned to S. For example, if the third compressed data CDAT3 is generated by dividing the current compressing block CAREA into two groups and by averaging and compressing data corresponding to each group (e.g., based on the third compression scheme and based on the second sub-compression scheme), MD and S may be set to "11" and "0," respectively. 3 bits of data may be assigned to PAT. For example, if the current compressing block CAREA corresponds to one of the patterns A, B, C, D, E, F and G, PAT may be set to one of "001," "010," "011," "100," "101,", "110" and "111." 1 bit of data may be assigned to NA, and 2 bits of data may be assigned to RA, GA, BA, RB, GB and BB, respectively. The third compressed data CDAT3 may assure the accuracy of the upper two bits of the averaged red, green and blue component values included in the third average data ADAT3 and the upper two bits of the averaged red, green and blue component values included in the fourth average data ADAT4.

Referring to FIG. 13B, MD and S represent the compression scheme for the third and fourth average data ADAT3 and ADAT4. PAT and T represent a pattern type of the current compressing block CAREA. RA, GA and BA represent a portion of the averaged red, green and blue component values included in the third average data ADAT3, respectively. RB, GB and BB represent a portion of the averaged red, green and blue component values included in the fourth average data ADAT4, respectively. RA, GA and BA may correspond to the lower bits of the averaged red, green and blue data included in the third average component values ADAT3, respectively. RB, GB and BB may correspond to the lower bits of the averaged red, green and blue component values included in the fourth average data ADAT4, respectively.

In an exemplary embodiment, the third compressed data CDAT3 is 19 bits of data. 2 bits of data may be assigned to MD, and 1 bit of data may be assigned to S. For example, if the third compressed data CDAT3 is generated by dividing the current compressing block CAREA into two groups and by averaging and compressing data corresponding to each group (e.g., based on the third compression scheme and based on the first sub-compression scheme), MD and S may be set to "11" and "1," respectively. 3 bits of data may be assigned to PAT. For example, if the current compressing block CAREA corresponds to one of the patterns A, B, C, D, E, F and G, PAT may be set to one of "001," "010," "011," "100," "101,", "110" and "111." 1 bit of data may be assigned to T. For example, if the second data CIMG associated with the current compressing block CAREA is toggled with respect to the third data associated with the previous compressing block PCAREA, T may be set to "1." If the second data CIMG is not toggled with respect to the third data, T may be set to "0." 2 bits of data may be assigned to RA, GA, BA, RB, GB and BB, respectively. The third compressed data CDAT3 may assure the accuracy of the upper four bits of the averaged red, green and blue component values included in the third average data ADAT3 and the upper four bits of the averaged red, green and blue component values included in the fourth average data ADAT4.

FIG. 14 is a block diagram illustrating an exemplary embodiment of an output unit included in the image encoding device of FIG. 1.

Referring to FIG. 14, the output unit 150 includes an error calculation block 152, a data selection block 154 and a bit stream generation block 156.

The error calculation block 152 may generate a first error signal ES1, a second error signal ES2 and a third error signal ES3 based on the first compressed data CDAT1, the second compressed data CDAT2, the third compressed data CDAT3 and the second data CIMG. The first error signal ES1 may correspond to a difference between the second data CIMG and the first compressed data CDAT1. The second error signal ES2 may correspond to a difference between the second data CIMG and the second compressed data CDAT2. The third error signal ES3 may correspond to a difference between the second data CIMG and the third compressed data CDAT3.

In an exemplary embodiment, if the current compressing block CAREA corresponds to the first pattern, the third compressed data CDAT3 corresponds to the predetermined null value, and the third error signal ES3 corresponding to the third compressed data CDAT3 has a maximum error value. In another exemplary embodiment, if the current compressing block CAREA corresponds to one of the plurality of second patterns, the second compressed data CDAT2 and/or the first compressed data CDAT1 corresponds to the predetermined null value, and the second error signal ES2 corresponding to the second compressed data CDAT2 and/or the first error signal ES1 corresponding to the first compressed data CDAT1 have the maximum error value.

The data selection block 154 may select one of the first compressed data CDAT1, the second compressed data CDAT2 and the third compressed data CDAT3 as the selected data, based on the first error signal ES1, the second error signal ES2 and the third error signal ES3. The selected data may have a minimum error with respect to the second data CIMG, and may be provided to the bit stream generation block 156 and the storage unit 170 in FIG. 1. The bit stream generation block 156 may generate the output compressed data OCDAT based on the selected data.

In an exemplary embodiment, the selected data may be one of the first compressed data CDAT1 and the second compressed data CDAT2 when the current compressing block CAREA corresponds to the first pattern, and the selected data may be the third compressed data CDAT3 when the current compressing block CAREA corresponds to one of the plurality of second patterns. In another exemplary embodiment, the selected data may be one of the first compressed data CDAT1 and the second compressed data CDAT2 when the current compressing block CAREA corresponds to the first pattern, and the selected data may be one of the first compressed data CDAT1 and the third compressed data CDAT3 when the current compressing block CAREA corresponds to one of the plurality of second patterns.

Figure 15:
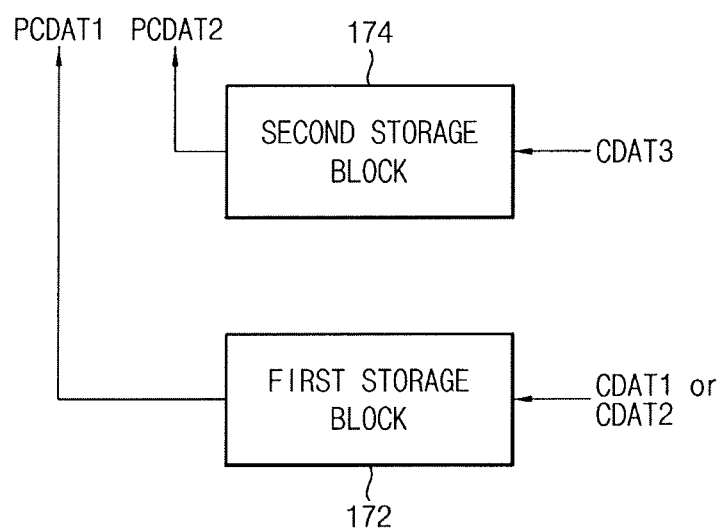
FIG. 15 is a block diagram illustrating an exemplary embodiment of a storage unit included in the image encoding device of FIG. 1.

FIG. 15 is a block diagram illustrating an exemplary embodiment of a storage unit included in the image encoding device of FIG. 1.

Referring to FIG. 15, the storage unit 170 includes a first storage block 172 and a second storage block 174.

The first storage block 172 may store the selected data output from the data selection block 154 in FIG. 14 when the selected data is one of the first compressed data CDAT1 and the second compressed data CDAT2. The first storage block 172 may output the first previous compressed data PCDAT1 that was previously stored in the first storage block 172. As described above with reference to FIGS. 7A, 7B, 11A and 11B, the bit stream of the first compressed data CDAT1 may be similar to the bit stream of the second compressed data CDAT2, and thus both the first compressed data CDAT1 and the second compressed data CDAT2 may be used as the first previous compressed data PCDAT1.

The second storage block 174 may store the selected data output from the data selection block 154 in FIG. 14 when the selected data is the third compressed data CDAT3. The second storage block 174 may output the second previous compressed data PCDAT2 that was previously stored in the second storage block 174. As described above with reference to FIGS. 13A and 13B, the bit stream of the third compressed data CDAT3 may be different from the bit streams of the first and second compressed data CDAT1 and CDAT2, and thus the third compressed data CDAT3 may be used as the second previous compressed data PCDAT2 that is distinct from the first previous compressed data PCDAT1.

In an exemplary embodiment, each of the first and second storage blocks 172 and 174 includes a line memory that stores the compressed data in units of lines.

As described above with reference FIGS. 1 through 15, in an embodiment, the image encoding device 100 generates 19 bits of the first compressed data CDAT1, 19 bits of the second compressed data CDAT2 and 19 bits of the third compressed data CDAT3 by compressing 96 bits of the second data CIMG associated with the current compressing area CAREA, selects one of the first compressed data CDAT1, the second compressed data CDAT2 and the third compressed data CDAT3 as the selected data, and outputs compressed data OCDAT based on the selected data. The selected data may have a minimum error with respect to the second data CIMG. Thus, the image encoding device 100 may compress the second data CIMG with a relatively high compression ratio (e.g., a compression ratio of about 1:5). In addition, the image encoding device 100 may have a relatively small size, reduced power consumption, and enhanced operation speed.

Figure 16:
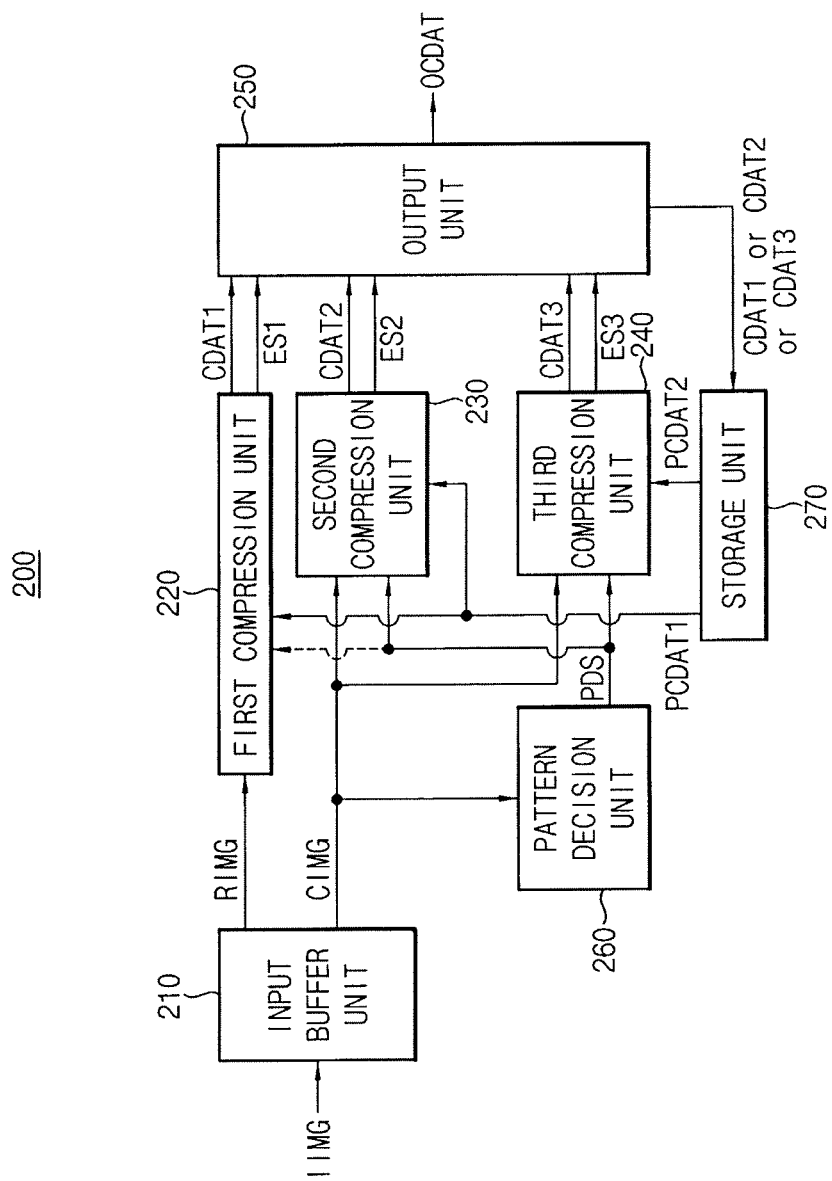
FIG. 16 is a block diagram illustrating an image encoding device according to an exemplary embodiment of the inventive concept.

FIG. 16 is a block diagram illustrating an image encoding device according to an exemplary embodiment of the inventive concept.

Referring to FIG. 16, an image encoding device 200 includes a first compression unit 220, a second compression unit 230, a third compression unit 240 and an output unit 250. The image encoding device 200 may further include an input buffer unit 210, a pattern decision unit 260 and a storage unit 270.

The first compression unit 220 generates the first compressed data CDAT1 by averaging and compressing the first data RIMG based on the first compression scheme. The first compression unit 220 may further generate the first error signal ES1 that corresponds to the difference between the second data CIMG and the first compressed data CDAT1. In this embodiment, the first compression unit 220 may include a first averaging block, a first mode selection block and a first compression block as illustrated in FIG. 4, and may further include a first error calculation block that generates the first error signal ES1.

The second compression unit 230 generates the second compressed data CDAT2 by averaging and compressing the second data CIMG based on the second compression scheme, when the current compressing block CAREA corresponds to the first pattern. The second compression unit 230 may further generate the second error signal ES2 that corresponds to the difference between the second data CIMG and the second compressed data CDAT2. In this embodiment, the second compression unit 230 may include a second averaging block, a second mode selection block and a second compression block as illustrated in FIG. 10, and may further include a second error calculation block that generates the second error signal ES2.

The third compression unit 240 generates the third compressed data CDAT3 by dividing the current compressing block CAREA into at least two groups, and by averaging and compressing data corresponding to each group based on the third compression scheme, when the current compressing block CAREA corresponds to one of the plurality of second patterns. The third compression unit 240 may further generate the third error signal ES3 that corresponds to the difference between the second data CIMG and the third compressed data CDAT3. In this embodiment, the third compression unit 240 may include a third averaging block, a third mode selection block and a third compression block as illustrated in FIG. 12, and may further include a third error calculation block that generates the third error signal ES3.

The output unit 250 may select one of the first compressed data CDAT1, the second compressed data CDAT2 and the third compressed data CDAT3 as the selected data, based on the first error signal ES1, the second error signal ES2 and the third error signal ES3. The selected data may have a minimum error with respect to the second data CIMG. The output unit 250 may output compressed data OCDAT based on the selected data. In an embodiment, the output unit 250 may be implemented without the error calculation block, and may include the data selection block and the bit stream generation block as illustrated in FIG. 14.

The input buffer unit 210, the pattern decision unit 260 and the storage unit 270 may be substantially the same as the input buffer unit 110, the pattern decision unit 160 and the storage unit 170 in FIG. 1, respectively.

In an exemplary embodiment, if the current compressing block CAREA corresponds to the first pattern, the third compressed data CDAT3 corresponds to the predetermined null value, and the third error signal ES3 corresponding to the third compressed data CDAT3 may have a maximum error value. In another exemplary embodiment, if the current compressing block CAREA corresponds to one of the plurality of second patterns, the second compressed data CDAT2 and/or the first compressed data CDAT1 correspond to the predetermined null value, and the second error signal ES2 corresponding to the second compressed data CDAT2 and/or the first error signal ES1 corresponding to the first compressed data CDAT1 may have a maximum error value.

Figure 17:
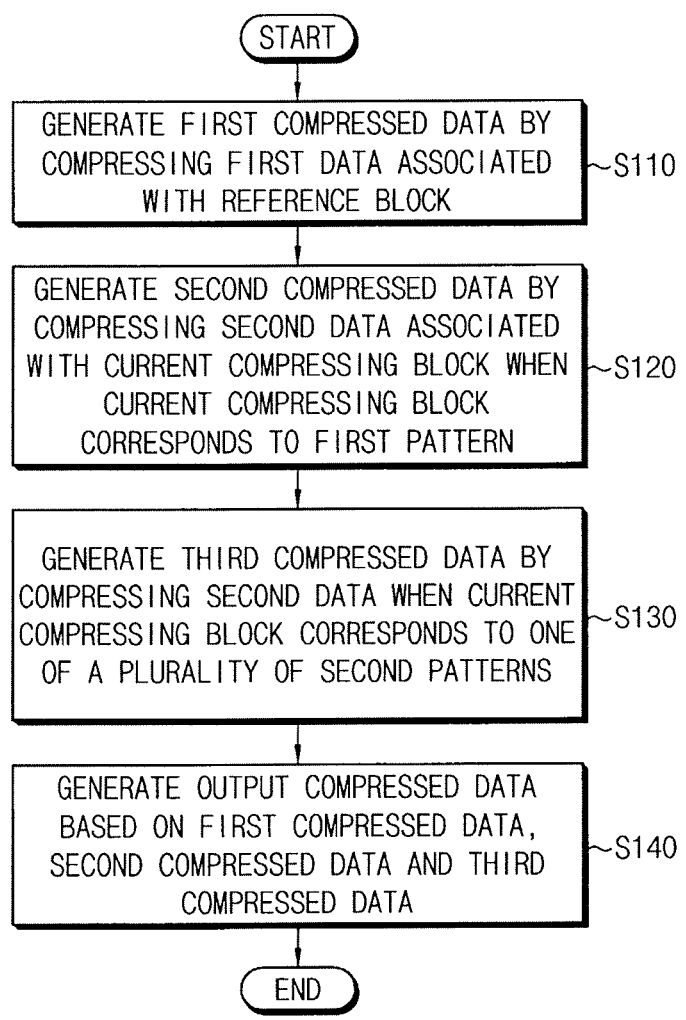
FIG. 17 is a flow chart illustrating a method of encoding an image according to an exemplary embodiment of the inventive concept.

FIG. 17 is a flow chart illustrating a method of encoding an image according to an exemplary embodiment of the inventive concept.

Referring to FIGS. 1, 2 and 17, in a method of encoding an image according to an exemplary embodiment, the first compressed data CDAT1 is generated by compressing the first data RIMG associated with the reference block RAREA based on the first compression scheme (step S110). When the current compressing block CAREA corresponds to the first pattern, the second compressed data CDAT2 is generated by compressing the second data CIMG associated with the current compressing block CAREA based on the second compression scheme (step S120). When the current compressing block CAREA corresponds to one of the plurality of second patterns, the third compressed data CDAT3 is generated by compressing the second data CIMG based on the third compression scheme (step S130). The output compressed data OCDAT is generated based on the first compressed data CDAT1, the second compressed data CDAT2 and the third compressed data CDAT3 (step S140). The output compressed data OCDAT corresponds to the current compressing block CAREA and the second data CIMG. For example, the reference block RAREA may be comprised of sixteen unit pixels that are arranged in a 4×4 square matrix formation. The current compressing block CAREA may be comprised of four unit pixels that are arranged in a 2×2 square matrix formation, and may be included in the reference block RAREA.

Figure 18:
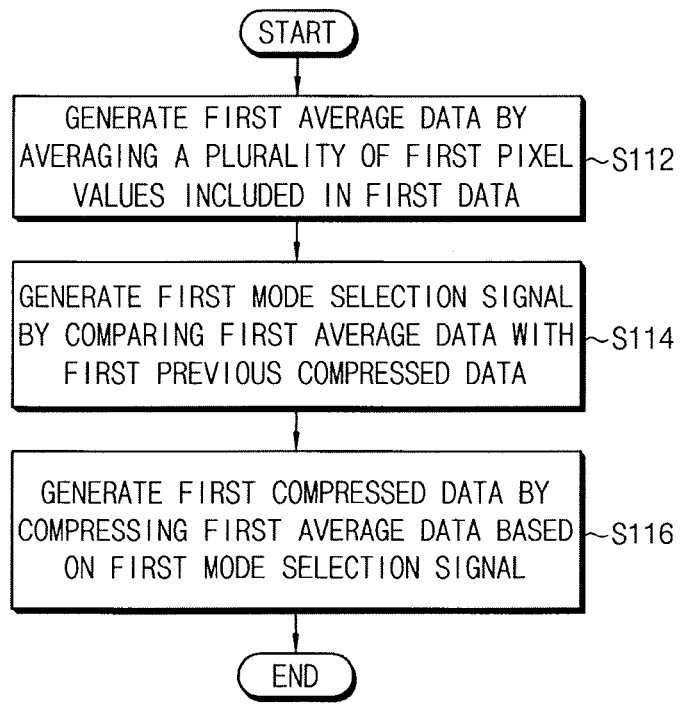
FIG. 18 is a flow chart illustrating an exemplary embodiment of step S110 in FIG. 17.

FIG. 18 is a flow chart illustrating an exemplary embodiment of step S110 in FIG. 17.

Referring to FIGS. 1, 2, 3, 4, 17 and 18, during step S110, the first average data ADAT1 may be generated by averaging the plurality of first pixel values included in the first data RIMG (step S112). The first mode selection signal MS1 may be generated by comparing the first average data ADAT1 with the first previous compressed data PCDAT1 (step S114). The first mode selection signal MS1 may indicate a sub-compression scheme for the first average data ADAT1. The first compressed data CDAT1 may be generated by compressing the first average data ADAT1 based on the first mode selection signal MS1 (step S116).

The first previous compressed data PCDAT1 may be generated by compressing the plurality of the third pixel values included in the third data associated with the previous compressing block PCAREA based on the first compression scheme or the second compression scheme. The sub-compression scheme for the first average data ADAT1 may include the first sub-compression scheme and the second sub-compression scheme. In the first sub-compression scheme, the first compressed data CDAT1 may be generated by calculating a difference between the first average data ADAT1 and the first previous compressed data PCDAT1 and by compressing the first average data ADAT1 based on the calculated difference. In the second sub-compression scheme, the first compressed data CDAT1 may be generated by truncating a portion of the first average data ADAT1.

Figure 19:
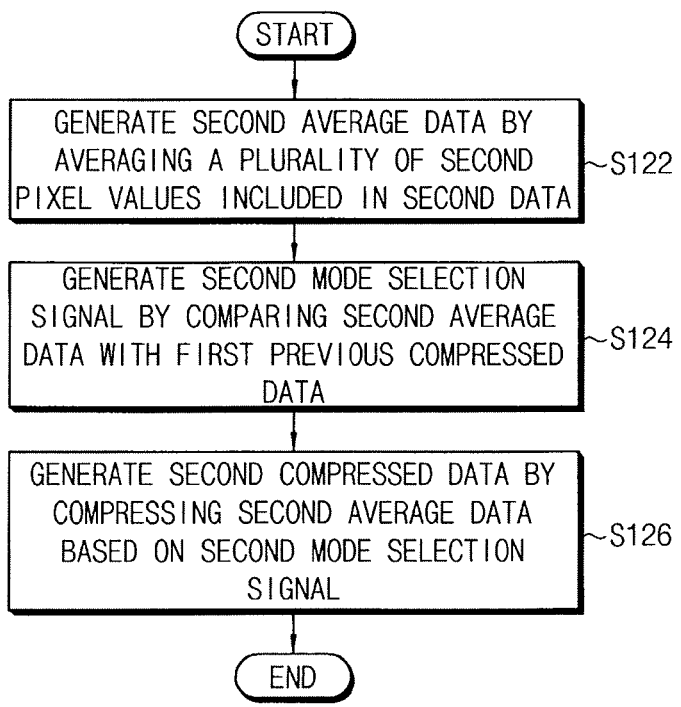
FIG. 19 is a flow chart illustrating an exemplary embodiment of step S120 in FIG. 17.

FIG. 19 is a flow chart illustrating an exemplary embodiment of step S120 in FIG. 17.

Referring to FIGS. 1, 2, 3, 10, 17 and 19, during step S120, the second average data ADAT2 may be generated by averaging the plurality of second pixel values included in the second data CIMG (step S122). The second mode selection signal MS2 may be generated by comparing the second average data ADAT2 with the first previous compressed data PCDAT1 (step S124). The second mode selection signal MS2 may indicate a sub-compression scheme for the second average data ADAT1. The second compressed data CDAT2 may be generated by compressing the second average data ADAT2 based on the second mode selection signal MS2 (step S126). The sub-compression scheme for the second average data ADAT2 may include the first sub-compression scheme and the second sub-compression scheme.

FIG. 20 is a flow chart illustrating an exemplary embodiment of step S130 in FIG. 17.

Referring to FIGS. 1, 2, 3, 12, 17 and 20, during step S130, the third and fourth average data ADAT3 and ADAT4 may be generated based on the plurality of second pixel values included in the second data CIMG (step S132). The third mode selection signal MS3 may be generated by comparing the third and fourth average data ADAT3 and ADAT4 with the second previous compressed data PCDAT2 (step S134). The third mode selection signal MS3 may indicate a sub-compression scheme for the third and fourth average data ADAT3 and ADAT4. The third compressed data CDAT3 may be generated by compressing the third and fourth average data ADAT3 and ADAT4 based on the third mode selection signal MS3 (step S136).

For example, the third average data ADAT3 may be generated by dividing the plurality of second pixel values included in the second data CIMG into the first group and the second group, and by averaging the pixel values included in the first group. The fourth average data ADAT4 may be generated by averaging the pixel values included in the second group. The second previous compressed data PCDAT2 may be generated by compressing the plurality of the third pixel values included in the third data associated with the previous compressing block PCAREA based on the third compression scheme. The sub-compression scheme for the third and fourth average data ADAT3 and ADAT4 may include the first sub-compression scheme and the second sub-compression scheme.

FIG. 21 is a flow chart illustrating an exemplary embodiment of step S140 in FIG. 17.

Referring to FIGS. 1, 2, 14, 17 and 21, during step S140, the first error signal ES1, the second error signal ES2 and the third error signal ES3 may be generated based on the first compressed data CDAT1, the second compressed data CDAT2, the third compressed data CDAT3 and the second data CIMG (step S142). One of the first compressed data CDAT1, the second compressed data CDAT2 and the third compressed data CDAT3 may be selected based on the first error signal ES1, the second error signal ES2 and the third error signal ES3 (step S144). The selected data may have the minimum error with respect to the second data CIMG. The output compressed data OCDAT may be generated based on the selected data (step S146).

The first error signal ES1 may correspond to the difference between the first data RIMG and the first compressed data CDAT1. In another embodiment, the first error signal ES1 may correspond to the difference between the second data CIMG and the first compressed data CDAT1. The second error signal ES2 may correspond to the difference between the second data CIMG and the second compressed data CDAT2. The third error signal ES3 may correspond to the difference between the second data CIMG and the third compressed data CDAT3.

Figure 22:
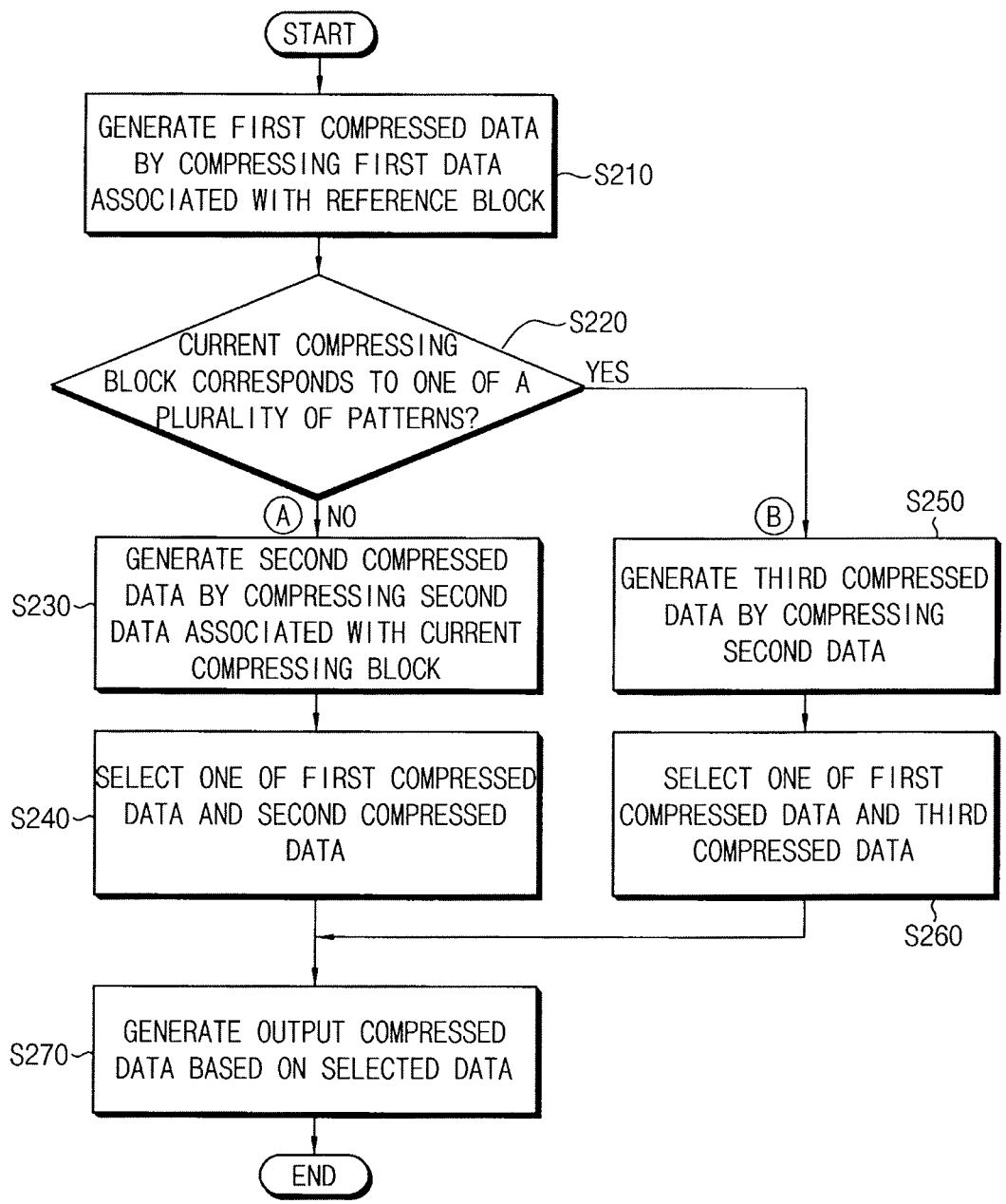
FIG. 22 is a flow chart illustrating a method of encoding an image according to an exemplary embodiment of the inventive concept.

FIG. 22 is a flow chart illustrating a method of encoding an image according to an exemplary embodiment of the inventive concept.

Referring to FIGS. 1, 2 and 22, in the method of encoding the image, the first compressed data CDAT1 is generated by compressing the first data RIMG associated with the reference block RAREA based on the first compression scheme (step S210). It is determined whether the current compressing block CAREA corresponds to one of the plurality of patterns (e.g., the plurality of second patterns in FIGS. 8B, 8C, 8D, 8E, 8F, 8G, 8H) (step S220). If the current compressing block CAREA does not correspond to one of the plurality of patterns, the second compressed data CDAT2 is generated by compressing the second data CIMG associated with the current compressing block CAREA based on the second compression scheme (step S230), and one of the first compressed data CDAT1 and the second compressed data CDAT2 is selected (step S240). The selection may be made such that the selected data has a minimum error with respect to the second data CIMG. If the current compressing block CAREA corresponds to one of the plurality of patterns, the third compressed data CDAT3 is generated by compressing the second data CIMG based on the third compression scheme (step S250), and one of the first compressed data CDAT1 and the third compressed data CDAT3 is selected (step S260). The selection may be made such that the selected data has a minimum error with respect to the second data CIMG. The output compressed data OCDAT is generated based on the selected data (step S270).

The steps S210, S230 and S250 may be substantially the same as the steps S110, S120, S130 in FIG. 17, respectively. The steps S240 and S270 may be similar to the step S140 in FIG. 17. The steps S260 and S270 may also be similar to the step S140 in FIG. 17.

Figure 23:
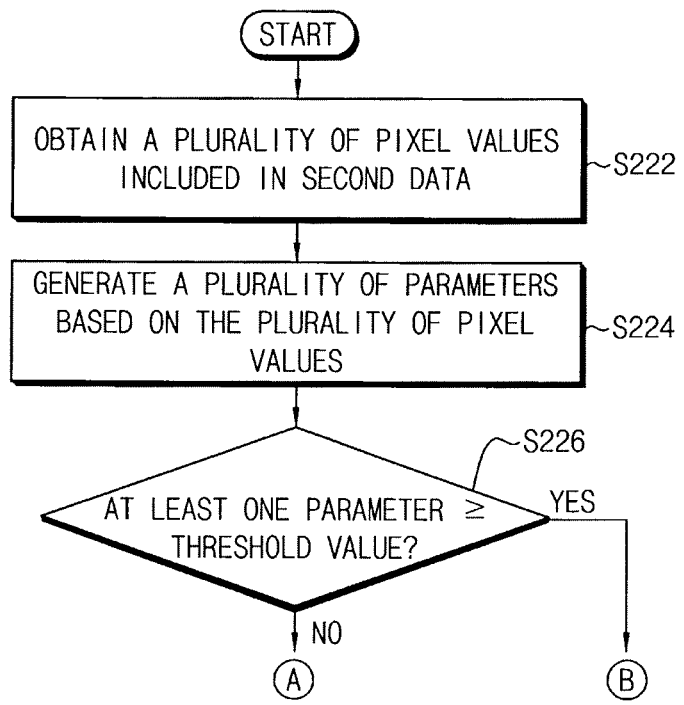
FIG. 23 is a flow chart illustrating an exemplary embodiment of step S220 in FIG. 22.

FIG. 23 is a flow chart illustrating an exemplary embodiment of step S220 in FIG. 22.

Referring to FIGS. 1, 2, 9, 22 and 23, during step S220, the plurality of pixel values included in the second data CIMG are obtained (step S222). The plurality of parameters PARA01, PARA23, PARA02, PARA13, PARA03 and PARA12 are generated based on the plurality of pixel values (step S224). For example, the plurality of parameters PARA01, PARA23, PARA02, PARA13, PARA03 and PARA12 may be calculated based on the Equations 1, 2, 3, 4, 5 and 6. It is determined whether at least one of the plurality of parameters PARA01, PARA23, PARA02, PARA13, PARA03 and PARA12 is larger than the threshold value TH (step S226).

If all of the plurality of parameters PARA01, PARA23, PARA02, PARA13, PARA03 and PARA12 are smaller than the threshold value TH, in other words, if the plurality of unit pixels included in the current compressing block CAREA have the same or substantially the same pixel value, it is determined that the current compressing block CAREA does not correspond to one of the plurality of patterns, and then steps S230, S240 and S270 may be performed. If at least one of the plurality of parameters PARA01, PARA23, PARA02, PARA13, PARA03 and PARA12 is larger than the threshold value TH, in other words, if some of the plurality of pixel values included in the second data CIMG are different from the others of the plurality of pixel values included in the second data CIMG, it is determined that the current compressing block CAREA corresponds to one of the plurality of patterns, and then steps S250, S260 and S270 may be performed.

Figure 24:
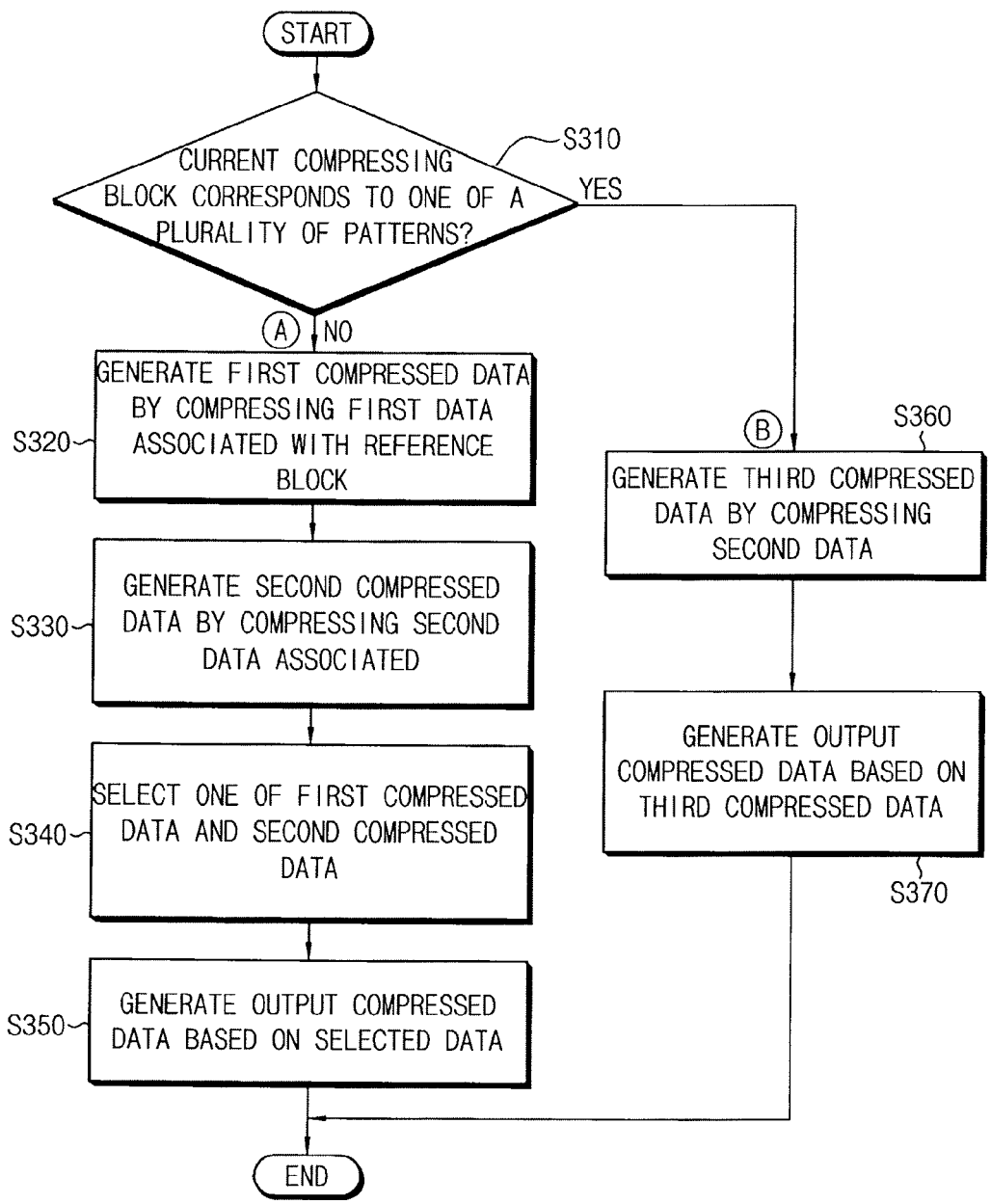
FIG. 24 is a flow chart illustrating a method of encoding an image according to an exemplary embodiment of the inventive concept.

FIG. 24 is a flow chart illustrating a method of encoding an image according to an exemplary embodiment of the inventive concept.

Referring to FIGS. 1, 2 and 24, in the method of encoding the image, it is determined whether the current compressing block CAREA corresponds to one of the plurality of patterns (step S310). If the current compressing block CAREA does not correspond to one of the plurality of patterns, the first compressed data CDAT1 is generated by compressing the first data RIMG associated with the reference block RAREA based on the first compression scheme (step S320), the second compressed data CDAT2 is generated by compressing the second data CIMG associated with the current compressing block CAREA based on the second compression scheme (step S330), one of the first compressed data CDAT1 and the second compressed data CDAT2 is selected (step S340), and the output compressed data OCDAT is generated based on the selected data (step S350). The selection may be made such that the selected data has a minimum error with respect to the second data CIMG. If the current compressing block CAREA corresponds to one of the plurality of patterns, the third compressed data CDAT3 is generated by compressing the second data CIMG based on the third compression scheme (step S360), and the output compressed data OCDAT is generated based on the third compressed data CDAT3 (step S370).

The step S310 may be substantially the same as the step S220 in FIG. 22. The steps S320, S330 and S360 may be substantially the same as the steps S110, S120, S130 in FIG. 17, respectively. The steps S340 and S350 may be similar to the step S140 in FIG. 17.

Figure 25:
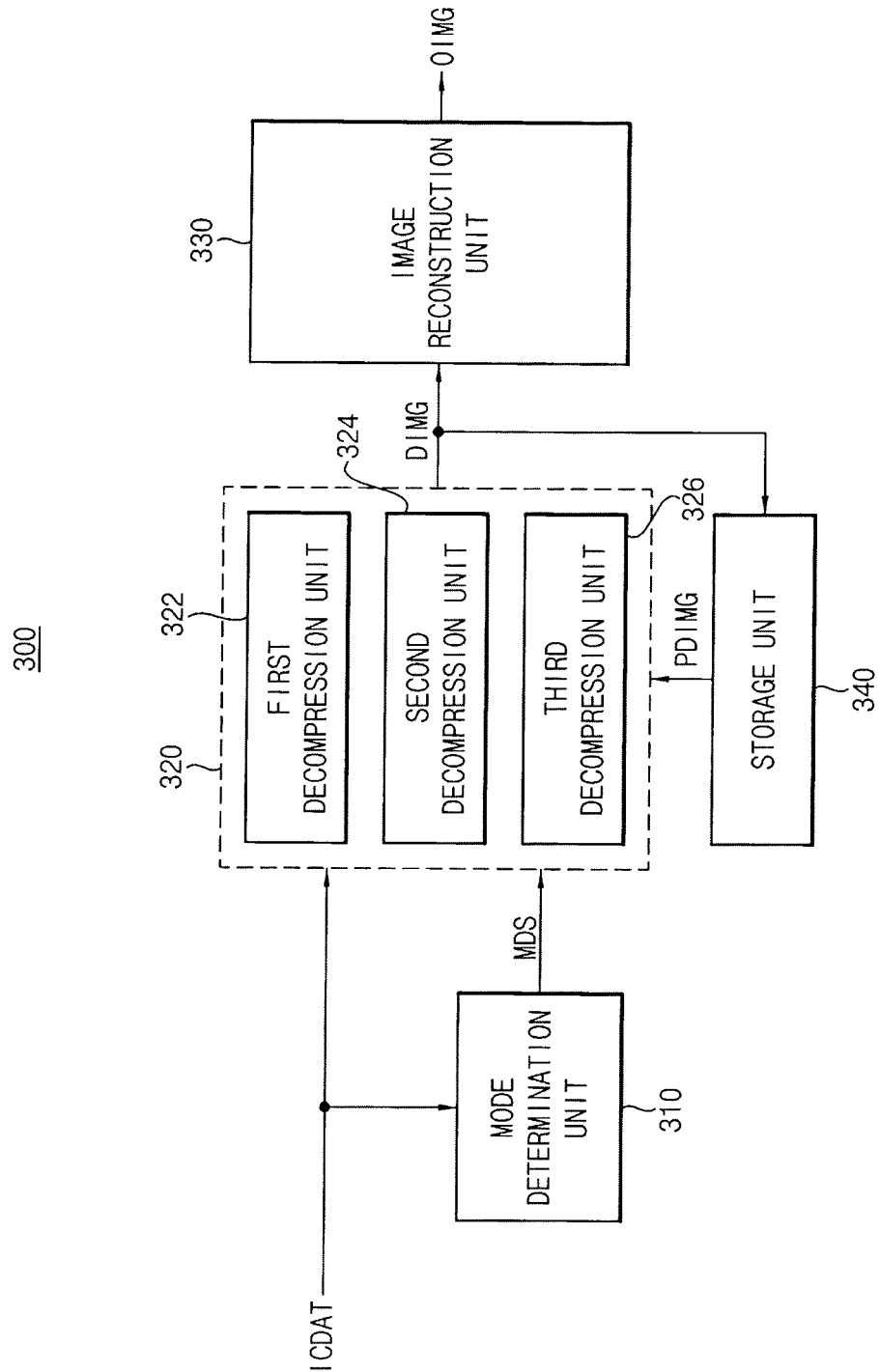
FIG. 25 is a block diagram illustrating an image decoding device according to an exemplary embodiment of the inventive concept.

FIG. 25 is a block diagram illustrating an image decoding device according to an exemplary embodiment of the inventive concept.

Referring to FIG. 25, an image decoding device 300 includes a mode determination unit 310, a decompression unit 320 and an image reconstruction unit 330. The image decoding device 300 may further include a storage unit 340.

The mode determination unit 310 generates a mode determination signal MDS by determining a compression scheme for input compressed data ICDAT. The input compressed data ICDAT may be provided from the image encoding device 100. In an exemplary embodiment, the input compressed data ICDAT is a digital bit stream signal that has one of the bit stream structures illustrated in FIGS. 7A, 7B, 11A, 11B, 13A and 13B.

In an exemplary embodiment, the mode determination unit 310 determines the compression scheme for the input compressed data ICDAT by detecting the upper bits of the input compressed data ICDAT. For example, if the upper one bit of the input compressed data ICDAT corresponds to "0," it is determined that the input compressed data ICDAT is generated based on the first compression scheme and the second sub-compression scheme, as described above with reference to FIG. 7A. If the upper four bits of the input compressed data ICDAT corresponds to "1000," it is determined that the input compressed data ICDAT is generated based on the first compression scheme and the first sub-compression scheme, as described above with reference to FIG. 7B. If the upper four bits of the input compressed data ICDAT corresponds to "1001" or "1010," it is determined that the input compressed data ICDAT is generated based on the second compression scheme and the second sub-compression scheme, or based on the second compression scheme and the first sub-compression scheme, as described above with reference to FIGS. 11A and 11B. If the upper three bits of the input compressed data ICDAT corresponds to "110" or "111," it is determined that the input compressed data ICDAT is generated based on the third compression scheme and the second sub-compression scheme, or based on the third compression scheme and the first sub-compression scheme, as described above with reference to FIGS. 13A and 13B.

The decompression unit 320 generates decompressed data DIMG associated with the current compressing block CAREA by decompressing the input compressed data ICDAT based on the mode determination signal MDS. The decompression unit 320 may include a first decompression unit 322, a second decompression unit 324 and a third decompression unit 326.

The first decompression unit 322 may generate the decompressed data DIMG based on a first decompression scheme when the input compressed data ICDAT is generated based on the first compression scheme. The first decompression scheme may correspond to the first compression scheme, and the first compression scheme may indicate that the input compressed data ICDAT is generated by averaging and compressing the first data RIMG associated with the reference block RAREA. As described above with reference to FIGS. 5 and 6, the first decompression scheme may include a first sub-decompression scheme corresponding to the first sub-compression scheme and a second sub-decompression scheme corresponding to the second sub-compression scheme. If the input compressed data ICDAT is generated based on the first compression scheme and the first sub-compression scheme, the decompressed data DIMG may be generated based on the input compressed data ICDAT and previous decompressed data PDIMG associated with the previous compressing block PCAREA.

The second decompression unit 324 may generate the decompressed data DIMG based on a second decompression scheme when the input compressed data ICDAT is generated based on the second compression scheme. The second decompression scheme may correspond to the second compression scheme, and the second compression scheme may indicate that the input compressed data ICDAT is generated by averaging and compressing the second data CIMG associated with the current compressing block CAREA. The second decompression scheme may include the first sub-decompression scheme and the second sub-decompression scheme.

The third decompression unit 326 may generate the decompressed data DIMG based on a third decompression scheme when the input compressed data ICDAT is generated based on the third compression scheme. The third decompression scheme may correspond to the third compression scheme, and the third compression scheme may indicate that the input compressed data ICDAT is generated by dividing the current compressing block CAREA into at least two groups, and by averaging and compressing data corresponding to each group. The third decompression scheme may include the first sub-decompression scheme and the second sub-decompression scheme.

The image reconstruction unit 330 generates image data OIMG of an output image by reconstructing the decompressed data DIMG. The image data OIMG of the output image may correspond to the image data IIMG of the input image that is input to the image encoding device 100 of FIG. 1. For example, the image data OIMG of the output image may be generated by arranging the previous decompressed data PDIMG and the decompressed data DIMG in an order of the decompression operation.

The storage unit 340 may store the decompressed data DIMG. The storage unit 340 may output the previous decompressed data PDIMG that was previously stored in the storage unit 340. The previous decompressed data PDIMG may be provided to the decompression unit 320.

In an embodiment, the image decoding device 300 determines the compression scheme for input compressed data ICDAT based on the upper bits of the input compressed data ICDAT, generates the decompressed data DIMG based on the decompression scheme corresponding to the determined compression scheme, and generates the image data OIMG of the output image based on the decompressed data DIMG. Thus, the image decoding device 300 is configured to decompress the data compressed by the image encoding device 100 of FIG. 1. In addition, the image decoding device 300 may have a relatively small size, reduced power consumption, and enhanced operation speed.

Figure 26:
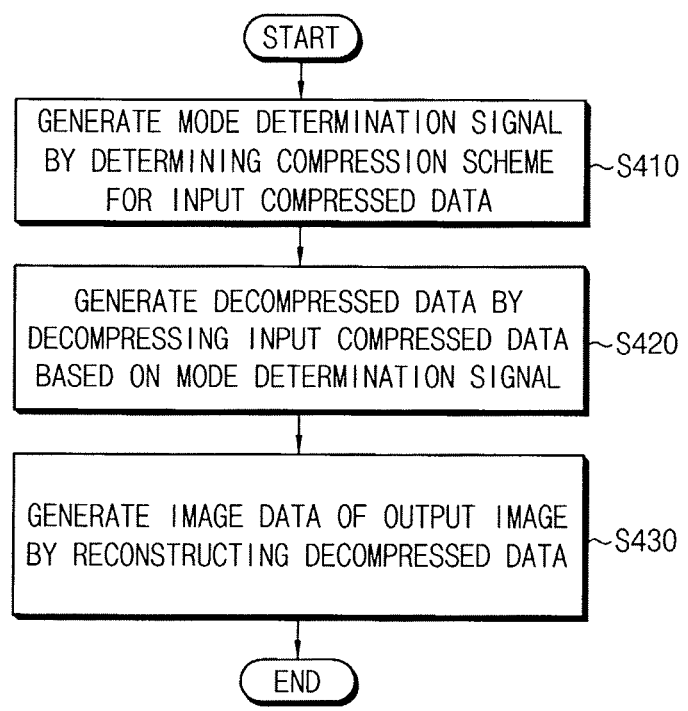
FIG. 26 is a flow chart illustrating a method of decoding a compressed image according to an exemplary embodiment of the inventive concept.

FIG. 26 is a flow chart illustrating a method of decoding a compressed image according to an exemplary embodiment of the inventive concept.

Referring to FIGS. 25 and 26, in the method of decoding the compressed image, the mode determination signal MDS is generated by determining the compression scheme for the input compressed data ICDAT (step S410). The decompressed data DIMG is generated by decompressing the input compressed data ICDAT based on the mode determination signal MDS (step S420). The image data OIMG of the output image is generated by reconstructing the decompressed data DIMG (step S430).

For example, one of the first, second and third compression schemes may be determined as the compression scheme for input compressed data ICDAT, and the decompressed data DIMG may be generated based on the determined compression scheme.

Figure 27:
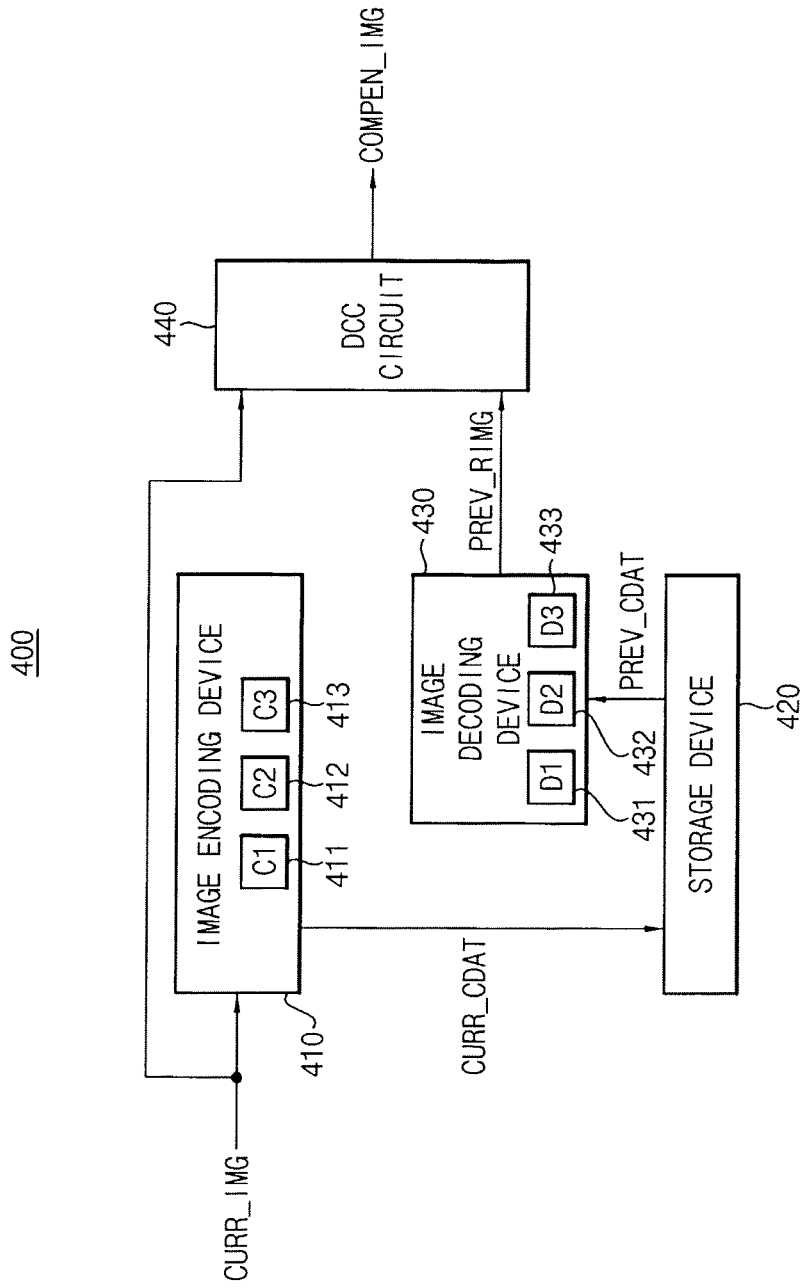
FIG. 27 is a block diagram illustrating an image processing device according to an exemplary embodiment of the inventive concept.

FIG. 27 is a block diagram illustrating an image processing device according to an exemplary embodiment of the inventive concept.

Referring to FIG. 27, an image processing device 400 includes an image encoding device 410, a storage device 420, an image decoding device 430 and a dynamic capacitance compensation (DCC) circuit 440.

The image encoding device 410 generates a compressed current image CURR_CDAT by compressing an original current image CURR_IMG. The image encoding device 410 may be the image encoding device 100 of FIG. 1 or the image encoding device 200 of FIG. 16, and may include a first compression unit 411, a second compression unit 412, a third compression unit 413 and an output unit (not illustrated). The first compression unit 411 generates first compressed data by compressing first data associated with a first reference block in the original current image CURR_IMG, based on a first compression scheme. When the first compressing block corresponds to a first pattern, the second compression unit 412 generates second compressed data by compressing second data associated with a first compressing block in the original current image CURR_IMG, based on a second compression scheme. The first compressing block is included in the first reference block. When the first compressing block corresponds to one of a plurality of second patterns, the third compression unit 413 generates third compressed data by compressing the second data based on a third compression scheme. The output unit generates output compressed data based on the first compressed data, the second compressed data and the third compressed data. The output compressed data corresponds to the second data and corresponds to a portion of the compressed current image CURR_CDAT. The image encoding device 410 may be able to compress the original current image CURR_IMG with a relatively high compression ratio, based on three distinct compression schemes.

The storage device 420 stores the compressed current image CURR_CDAT, and outputs a compressed previous image PREV_CDAT that was previously stored in the storage device 420. The compressed previous image PREV_CDAT is generated by compressing an original previous image preceding the original current image CURR_IMG. The storage device 420 may include a frame memory that stores a compressed image in units of frames.

The image decoding device 430 generates a reconstructed previous image PREV_RIMG by decompressing the compressed previous image PREV_CDAT. The image decoding device 430 may be the image decoding device 300 of FIG. 25, and may include a mode determination unit (not illustrated), a first decompression unit 431, a second decompression unit 432, a third decompression unit 433 and an image reconstruction unit (not illustrated). The mode determination unit may generate a mode determination signal by determining a compression scheme for fourth compressed data associated with a second compressing block in the original previous image. The second compressing block in the original previous image may correspond to the first compressing block in the original current image CURR_IMG. The decompression units 431, 432 and 433 may generate decompressed data by decompressing the fourth compressed data based on the mode determination signal. The image reconstruction unit may generate the reconstructed previous image PREV_RIMG by reconstructing the decompressed data. The first, second and third decompression units 431, 432 and 433 in the image decoding device 430 may correspond to the first, second and third compression units 411, 412 and 413 in the image encoding device 410, respectively. The first decompression unit 431 may generate the decompressed data based on a first decompression scheme when the fourth compressed data is generated by compressing a plurality of pixel values associated with a second reference block in the original previous image. The second reference block in the original previous image may correspond to the first reference block in the original current image CURR_IMG; and the second compressing block may be included in the second reference block. The second decompression unit 432 may generate the decompressed data based on a second decompression scheme when the fourth compressed data is generated by compressing a plurality of pixel values associated with the second compressing block in the original previous image. The third decompression unit 433 may generate the decompressed data based on a third decompression scheme when the fourth compressed data is generated by dividing the plurality of pixel values associated with the second compressing block into a first group and a second group, by compressing pixel values included in the first group, and by compressing pixel values included in the second group. The image decoding device 430 is configured to decompress the data compressed by the image encoding device 410.

The DCC circuit 440 generates a compensation image COMPEN_IMG based on the original current image CURR_IMG and the reconstructed previous image PREV_RIMG.

Figure 28:
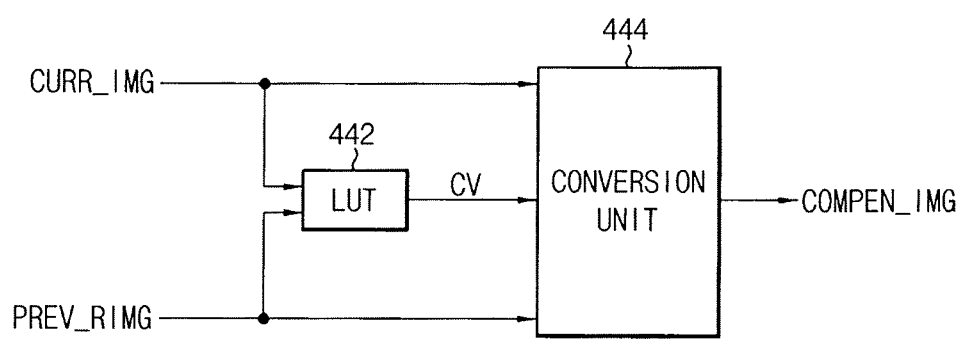
FIG. 28 is a block diagram illustrating an exemplary embodiment of a DCC circuit included in the image processing device of FIG. 27.

FIG. 28 is a block diagram illustrating an exemplary embodiment of a DCC circuit included in the image processing device of FIG. 27.

Referring to FIG. 28, the DCC circuit 440 includes a lookup table 442 and a conversion unit 444.

The lookup table 442 may store a plurality of compensation values that are used to compensate the original current image CURR_IMG. The lookup table 442 may select at least one of the compensation values based on the original current image CURR_IMG and the reconstructed previous image PREV_RIMG to provide the selected compensation value CV to the conversion unit 444.

The conversion unit 444 may selectively compensate the original current image CURR_IMG by comparing the original current image CURR_IMG with the reconstructed previous image PREV_RIMG. For example, if a difference between the original current image CURR_IMG and the reconstructed previous image PREV_RIMG is smaller than a compensation reference value, the conversion unit 444 may output the original current image CURR_IMG as the compensation image COMPEN_IMG without any compensation and/or conversion. If the difference between the original current image CURR_IMG and the reconstructed previous image PREV_RIMG is larger than the compensation reference value, the conversion unit 444 may generate the compensation image COMPEN_IMG by compensating the original current image CURR_IMG based on the selected compensation value CV.

The image processing device 400 according to an exemplary embodiment of the inventive concept includes the image encoding device 410 and the image decoding device 430. The device 400 may have a relatively small size and a relatively high compression/decompression ratio, thereby reducing the size of the storage device 420. The image processing device 400 generates the compensation image COMPEN_IMG, and thus a response speed of a display device driven by the image processing device 400 may be enhanced, and a defect, such as a flicker noise, on the display device may be reduced. Accordingly, the image processing device 400 may be employed in an image display system that includes a large display device and/or a high frequency display device.

Figure 29:
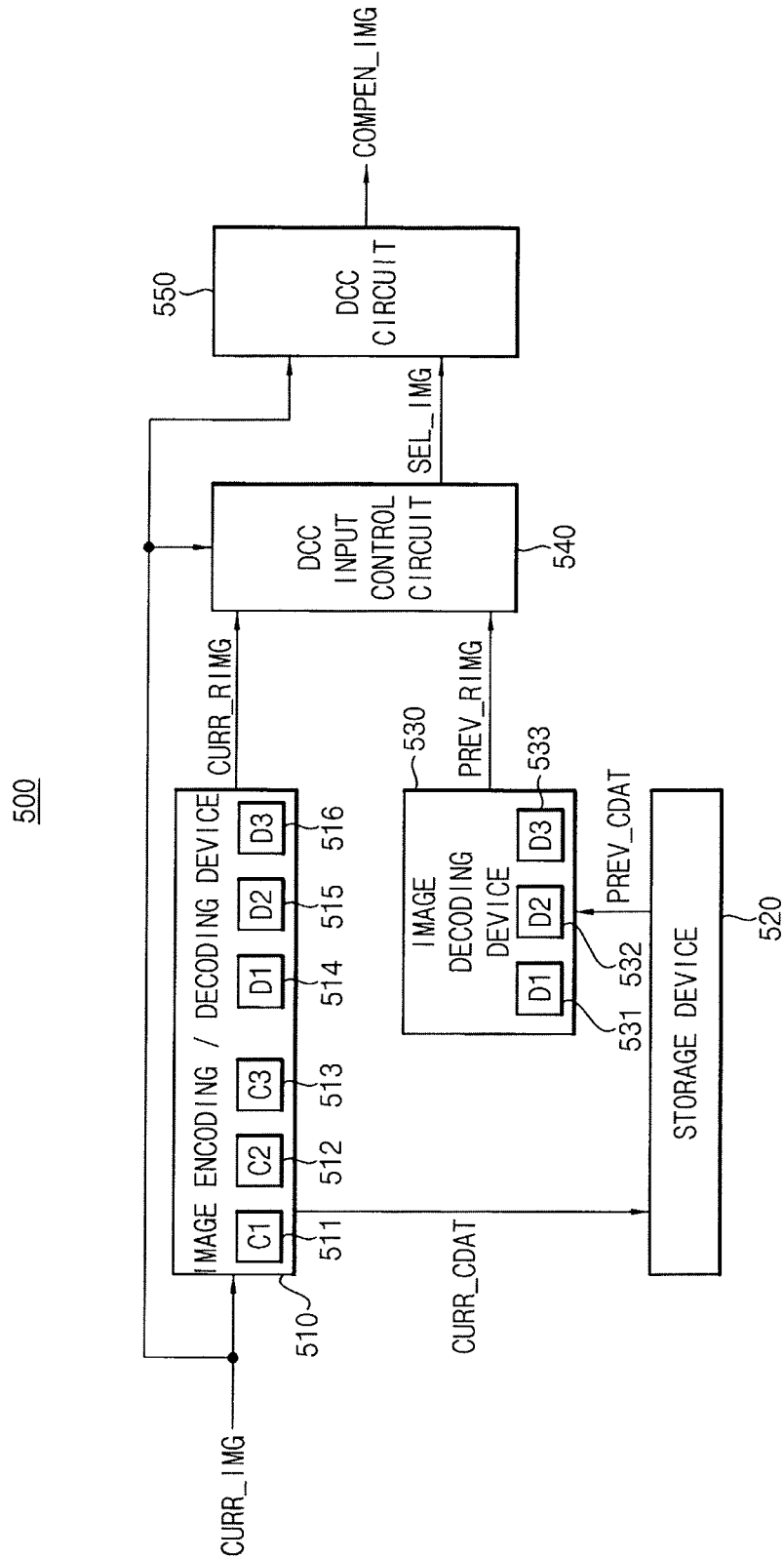
FIG. 29 is a block diagram illustrating an image processing device according to exemplary embodiment of the inventive concept.

FIG. 29 is a block diagram illustrating an image processing device according to an exemplary embodiment of the inventive concept.

Referring to FIG. 29, an image processing device 500 includes an image encoding/decoding device 510, a storage device 520, an image decoding device 530, a DCC input control circuit 540 and a DCC circuit 550.

The image encoding/decoding device 510 generates a compressed current image CURR_CDAT by compressing an original current image CURR_IMG, and generates a reconstructed current image CURR_RIMG by decompressing the compressed current image CURR_CDAT. The image encoding/decoding device 510 may be implemented with an image encoding device and an image decoding device. The image encoding device may be the image encoding device 100 of FIG. 1 or the image encoding device 200 of FIG. 16, and may include a first compression unit 511, a second compression unit 512, a third compression unit 513 and an output unit (not illustrated). The image decoding device may be the image decoding device 300 of FIG. 25, and may include a mode determination unit (not illustrated), a first decompression unit 514, a second decompression unit 515, a third decompression unit 516 and an image reconstruction unit (not illustrated). The image encoding/decoding device 510 may be configured to compress the original current image CURR_IMG with a relatively high compression ratio, based on three distinct compression schemes, and decompress the compressed current image CURR_CDAT.

The storage device 520 stores the compressed current image CURR_CDAT, and outputs a compressed previous image PREV_CDAT that was previously stored in the storage device 520.

The image decoding device 530 generates a reconstructed previous image PREV_RIMG by decompressing the compressed previous image PREV_CDAT. The image decoding device 530 may be the image decoding device 300 of FIG. 25, and may include a mode determination unit (not illustrated), a first decompression unit 531, a second decompression unit 532, a third decompression unit 533 and an image reconstruction unit (not illustrated). The image decoding device 530 may decompress the data compressed by the image encoding/decoding device 510.

In an embodiment, the DCC input control circuit 540 determines whether the original current image CURR_IMG is a still image or a moving image based on the reconstructed previous image PREV_RIMG and the reconstructed current image CURR_RIMG, and outputs one of the original current image CURR_IMG and the reconstructed previous image PREV_RIMG as a selected image SEL_IMG based on a result of the determination.

Figure 30:
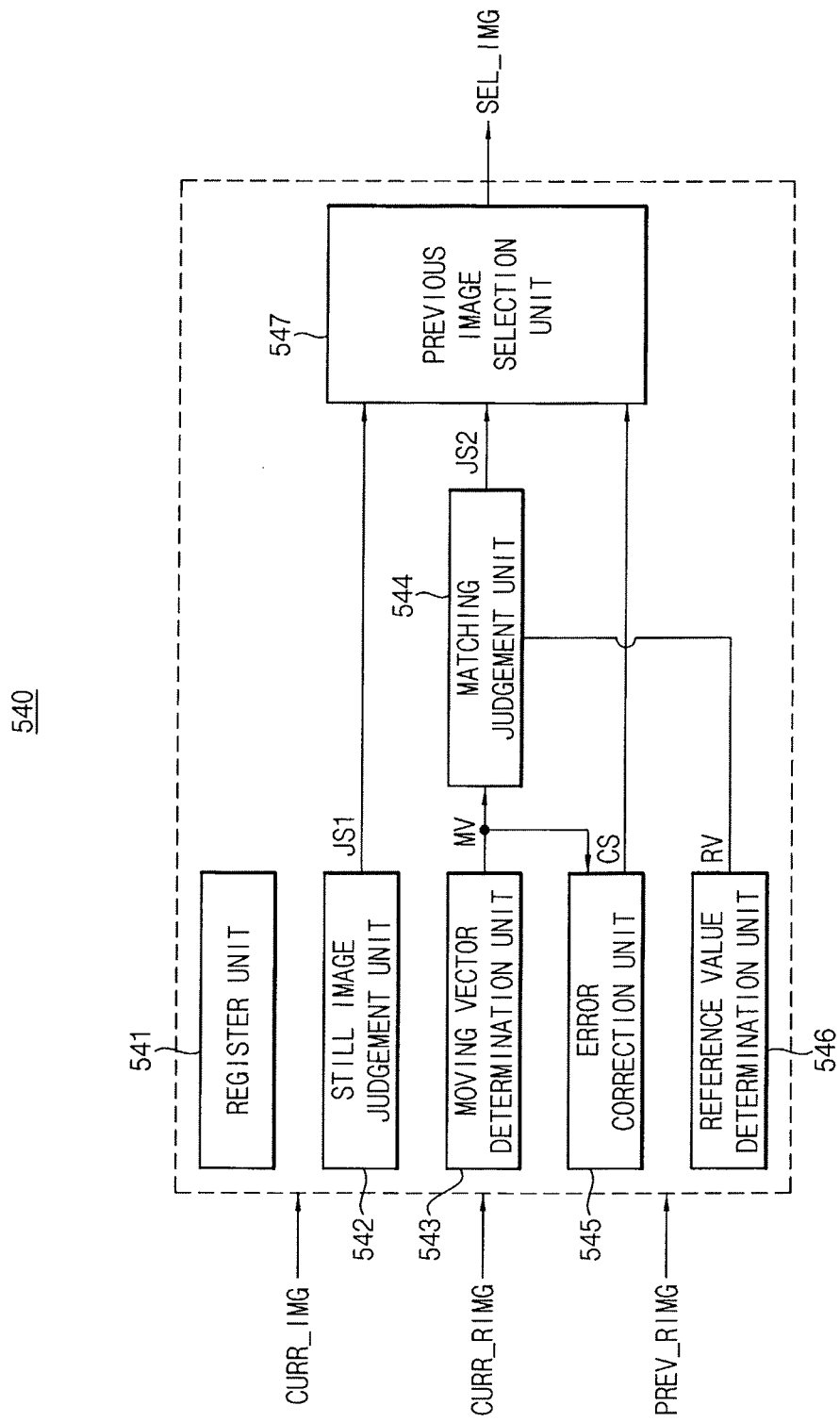
FIG. 30 is a block diagram illustrating an exemplary embodiment of a DCC input control circuit included in the image processing device of FIG. 29.

FIG. 30 is a block diagram illustrating an exemplary embodiment of a DCC input control circuit included in the image processing device of FIG. 29.

Referring to FIG. 30, the DCC input control circuit 540 includes a register unit 541, a still image judgment unit 542, a moving vector determination unit 543, a matching judgment unit 544, an error correaction unit 545, a reference value determination unit 546 and a previous image selection unit 547.

The register unit 541 may store at least one image that corresponds to a motion estimation range of a compressing block, among the original current image CURR_IMG, the reconstructed previous image PREV_RIMG and the reconstructed current image CURR_RIMG.

In an embodiment, the still image judgment unit 542 generates a first judgment signal JS1 based on the reconstructed previous image PREV_RIMG and the reconstructed current image CURR_RIMG. The first judgment signal JS1 may indicate whether the original current image CURR_IMG is a still image or a moving image.

The moving vector determination unit 543 may determine a motion vector MV based on a first image that is one of the reconstructed previous image PREV_RIMG and the original current image CURR_IMG and corresponds to the motion estimation range of the compressing block.

The matching judgment unit 544 may generate a second judgment signal JS2 by determining the matching of the motion vector MV based on a reference value RV. For example, the matching judgment unit 544 may compare the motion vector MV with the reference value RV and the second judgment signal JS2 may be a result of the comparison.

The error correction unit 545 may generate a correction signal CS by determining whether the currently determined motion vector MV is consistent with a previously determined motion vector, and by determining whether the currently determined motion vector MV is consistent with peripheral motion vectors. For example, if the currently motion vector MV is the same as or only differs from the previous motion vector by a small threshold amount, they may be considered consistent with one another.

In an embodiment, the reference value determination unit 546 is configured to determine the reference value RV.

The previous image selection unit 547 may output one of the original current image CURR_IMG and the reconstructed previous image PREV_RIMG as the selected image SEL_IMG based on the first judgment signal JS1, the second judgment signal JS2 and the correction signal CS.

If it is determined that data included in the original current image CURR_IMG is not substantially the same as data included in the reconstructed previous image PREV_RIMG, the DCC input control circuit 540 outputs the reconstructed previous image PREV_RIMG as the selected image SEL_IMG. If it is determined that the data included in the original current image CURR_IMG is substantially the same as the data included in the reconstructed previous image PREV_RIMG, the DCC input control circuit 540 outputs the original current image CURR_IMG as the selected image SEL_IMG.

Referring back to FIG. 29, the DCC circuit 550 generates a compensation image COMPEN_IMG based on the original current image CURR_IMG and the selected image SEL_IMG.

The image processing device 500 according to an exemplary embodiment of the inventive concept includes the image encoding/decoding device 510 and the image decoding device 530. The device 500 may have a relatively small size and a relatively high compression/decompression ratio, thereby reducing the size of the storage device 520. The image processing device 500 generates the compensation image COMPEN_IMG, and thus a response speed of a display device driven by the image processing device 500 may be enhanced, and a defect, such as a flicker noise, on the display device may be reduced. Accordingly, the image processing device 500 may be employed in an image display system that includes a large display device and/or a high frequency display device.

Figure 31:
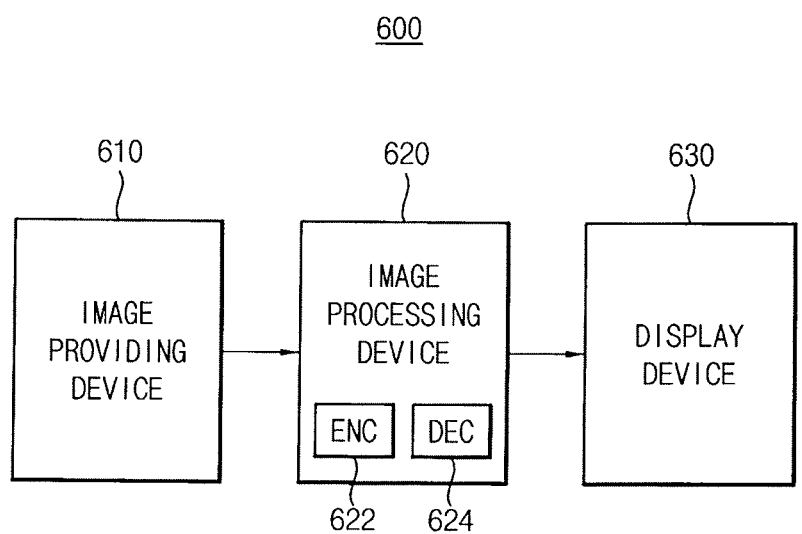
FIG. 31 is a block diagram illustrating a display system according to an exemplary embodiment of the inventive concept.

FIG. 31 is a block diagram illustrating a display system according to an exemplary embodiment of the inventive concept.

Referring to FIG. 31, a display system 600 includes an image providing device 610, an image processing device 620 and a display device 630.

The image providing device 610 provides image (e.g., an image including RGB data) to the image processing device 620. For example, the image providing device 610 may provide at least one of various sources of image, such as image receiver of a digital TV (e.g., a set-top box), a computer, etc.

The image processing device 620 compensates the image received from the image providing device 610 to generate a compensation image. The image is displayed on the display device 630 based on the compensation image received from the image processing device 620.

The image processing device 620 may be the image processing device 400 of FIG. 27 or the image processing device 500 of FIG. 29, and may include an image encoding device 622 and an image decoding device 624. The image encoding device 622 may compress the image with a relatively high compression ratio, based on three distinct compression schemes. The image decoding device 624 may decompress the data compressed by the image encoding device 622. Thus, the display device 630 may have enhanced response speed and may provide a high quality image.

According to an exemplary embodiment of the inventive concept, the display device 630 includes at least one of various display panels, such as a cathode ray tube (CRT) panel, a plasma display panel (PDP), a light emitting diode (LED) display panel, an organic LED (OLED) display panel, a field emission display (FED) panel, etc.

At least one of the above described embodiments may be applied to a system including an image processing device performing image compression/decompression operations and the display device. For example, at least one of the above described embodiments may be applied to various electronic devices, such as a memory card, a solid state drive, a desktop computer, a laptop computer, a tablet computer, a mobile phone, a smart phone, a music player, a personal digital assistant PDA, a personal media player PMP, a digital television, a digital camera, a portable game console, etc.

The foregoing is illustrative of example embodiments and is not to be construed as limiting thereof. Although exemplary embodiments have been described, many modifications are possible in these exemplary embodiments without materially departing from the present inventive concept. Accordingly, all such modifications are intended to be included within the scope of the present inventive concept.

What is claimed is:

1. An image encoding device, comprising:
    a first compression unit configured to generate first compressed data by compressing first data associated with a reference block in an input image;
    a second compression unit configured to generate second compressed data by compressing second data associated with a current compressing block in the input image when the current compressing block corresponds to a first pattern, wherein the current compressing block is included in the reference block;
    a third compression unit configured to generate third compressed data by compressing the second data when the current compressing block corresponds to one of a plurality of second patterns; and
    an output unit configured to output compressed data based on the first compressed data, the second compressed data and the third compressed data.

2. The image encoding device of claim 1, wherein the second compression unit generates the second compressed data if a difference between a first pixel value of the second data and a second pixel value of the second data is smaller than a threshold value.

3. The image encoding device of claim 2, wherein the third compression unit generates the third compressed data if the difference between the first pixel value and the second pixel value is equal to or larger than the threshold value.

4. The image encoding device of claim 1, wherein the output unit selects one of the first compressed data, the second compressed data and the third compressed data as selected data, and outputs the compressed data based on the selected data.

5. The image encoding device of claim 4, wherein the selected data is one of the first compressed data and the second compressed data when the current compressing block corresponds to the first pattern, and wherein the selected data is the third compressed data when the current compressing block corresponds to one of the plurality of second patterns.

6. The image encoding device of claim 1, wherein the first data include a plurality of first pixel values and the second data include a plurality of second pixel values, and wherein the first compression unit comprises:
    a first averaging block configured to generate first average data by averaging the plurality of first pixel values;
    a first mode selection block configured to generate a first mode selection signal by comparing the first average data with first previous compressed data, wherein the first mode selection signal indicates a compression scheme for the first average data, wherein the first previous compressed data is generated by compressing third data associated with a previous compressing block in the input image, and wherein the previous compressing block is adjacent the current compressing block; and
    a first compression block configured to generate the first compressed data by compressing the first average data based on the first mode selection signal.

7. The image encoding device of claim 6, wherein the first compressed data is generated based on a differential pulse code modulation (DPCM) scheme that calculates a difference between the first average data and the first previous compressed data and compresses the first average data based on the calculated difference if the first mode selection signal has a first logic level, and wherein the first compressed data is generated based on a pulse code modulation (PCM) scheme that truncates a portion of the first average data if the first mode selection signal has a second logic level.

8. The image encoding device of claim 6, wherein the second compression unit comprises:
    a second averaging block configured to generate second average data by averaging the plurality of second pixel values;
    a second mode selection block configured to generate a second mode selection signal by comparing the second average data with the first previous compressed data, wherein the second mode selection signal indicates a compression scheme for the second average data; and
    a second compression block configured to generate the second compressed data by compressing the second average data based on the second mode selection signal.

9. The image encoding device of claim 8, wherein the third compression unit comprises:
    a third averaging block configured to divide the plurality of second pixel values into a first group and a second group, configured to generate third average data by averaging pixel values included in the first group, and configured to generate fourth average data by averaging pixel values included in the second group;
    a third mode selection block configured to generate a third mode selection signal by comparing the third and fourth average data with second previous compressed data, wherein the third mode selection signal indicates a compression scheme for the third and fourth average data, and wherein the second previous compressed data is generated by compressing the third data in a manner distinct from the first previous compressed data; and
    a third compression block configured to generate the third compressed data by compressing the third and fourth average data based on the third mode selection signal.

10. The image encoding device of claim 9, further comprising:
    a storage unit configured to store one of the first compressed data, the second compressed data and the third compressed data, and configured to output the first previous compressed data and the second previous compressed data that were previously stored in the storage unit.

11. The image encoding device of claim 1, further comprising:
    a pattern decision unit configured to compare a first pixel value with a second pixel value to generate comparison results and configured to generate a pattern decision signal based on the comparison results, wherein the second data associated with the current compressing block includes a plurality of pixel values, wherein each of the first and second pixel values is one of the plurality of pixel values, and wherein the pattern decision signal indicates whether the current compressing block corresponds to the first pattern or one of the plurality of second patterns.

12. An image processing device, comprising:
an image encoding device configured to generate a compressed current image by compressing an original current image;
a storage device configured to store the compressed current image, and configured to output a compressed previous image that was previously stored in the storage device, wherein the compressed previous image is generated by compressing an original previous image preceding the original current image;
an image decoding device configured to generate a reconstructed previous image by decompressing the compressed previous image; and
a dynamic capacitance compensation (DCC) circuit configured to generate a compensation image based on the original current image and the reconstructed previous image, and
wherein the image encoding device, comprises:
 a first compression unit configured to generate first compressed data by compressing first data associated with a first reference block in the original current image;
 a second compression unit configured to generate second compressed data by compressing second data associated with a first compressing block in the original current image when the first compressing block corresponds to a first pattern, wherein the first compressing block is included in the first reference block;
 a third compression unit configured to generate third compressed data by compressing the second data when the first compressing block corresponds to one of a plurality of second patterns; and
 an output unit configured to output compressed data based on the first compressed data, the second compressed data and the third compressed data, the output compressed data corresponding to the first compressing block and corresponding to a portion of the compressed current image.

13. The image processing device of claim 12, further comprising:
a DCC input control circuit configured to determine whether the original current image is a still image or a moving image based on the reconstructed previous image and a reconstructed current image, and configured to output one of the original current image and the reconstructed previous image as a selected image based on a result of the determination, wherein the reconstructed current image is generated by decompressing the compressed current image,
wherein the DCC circuit generates the compensation image based on the original current image and the selected image.

14. The image processing device of claim 12, wherein the image decoding device comprises:
a mode determination unit configured to generate a mode determination signal by determining a compression scheme for fourth compressed data associated with a second compressing block in the original previous image, wherein the second compressing block corresponds to the first compressing block in the original current image;

a decompression unit configured to generate decompressed data by decompressing the fourth compressed data based on the mode determination signal; and
an image reconstruction unit configured to generate the reconstructed previous image by reconstructing the decompressed data.

15. The image processing device of claim 14, wherein the decompression unit includes:
a first decompression unit configured to generate the decompressed data based on a first decompression scheme when the fourth compressed data is generated by compressing a plurality of first pixel values associated with a second reference block in the original previous image, the second reference block corresponding to the first reference block in the original current image, and wherein the second compressing block is included in the second reference block;
a second decompression unit configured to generate the decompressed data based on a second decompression scheme when the fourth compressed data is generated by compressing a plurality of second pixel values associated with the second compressing block; and
a third decompression unit configured to generate the decompressed data based on a third decompression scheme when the fourth compressed data is generated by dividing the plurality of second pixel values into a first group and a second group, by compressing pixel values included in the first group, and by compressing pixel values included in the second group.

16. A compression system, comprising:
a first compression unit configured to generate first compressed data by compressing first average data that is an average of pixel values of a part of an input image;
a second compression unit configured to generate second compressed data by compressing second average data that is an average of pixel values of a sub-part within the part smaller than the part when the sub-part is one pattern;
a third compression unit configured to generate third compressed data by compressing third and fourth average data when the sub-part is a second other pattern, wherein the third average data is an average of some of the pixel values and the fourth average data is an average of the remaining pixel values; and
an output unit configured to output compressed data by selecting one of the first, second, and third compressed data.

17. The compression system of claim 16, wherein the first compression unit is configured to output an error signal based on a difference between the sub-part and the first compressed data, wherein the second compression units is configured to output an error signal based on a difference between the sub-part and the second compressed data, and the third compression unit is configured to output an error signal based on a difference between the sub-part and the third compressed data.

18. The compression system of claim 16, wherein each compression unit compresses average data input thereto based on a differential pulse code modulation (DPCM) scheme when previously compressed data is available and based on a PCM scheme otherwise.

19. The compression system of claim 17, wherein when the sub-part is not the one pattern, the second compression unit disables compression within itself.

20. The compression system of claim 17, wherein when the sub-part is not the other pattern, the third compression unit disables compression within itself.

\* \* \* \* \*